United States Patent
Merlin et al.

(10) Patent No.: US 9,173,234 B2
(45) Date of Patent: Oct. 27, 2015

(54) PROTECTION MECHANISMS FOR MULTI-USER MIMO TRANSMISSIONS

(75) Inventors: Simone Merlin, San Diego, CA (US); Santosh Paul Abraham, San Diego, CA (US); Hemanth Sampath, San Diego, CA (US); Vincent Knowles Jones, San Diego, CA (US); Maarten Menzo Wentink, Naarden (NL); Mohammad Hossein Taghavi Nasrabadi, San Diego, CA (US); Sameer Vermani, San Diego, CA (US); Didier Johannes Richard Van Nee, De Meern (NL)

(73) Assignee: QUALCOMM Incorporated, San Diego, CA (US)

(*) Notice: Subject to any disclaimer, the term of this patent is extended or adjusted under 35 U.S.C. 154(b) by 195 days.

(21) Appl. No.: 13/076,031

(22) Filed: Mar. 30, 2011

(65) Prior Publication Data
US 2012/0076073 A1 Mar. 29, 2012

Related U.S. Application Data

(60) Provisional application No. 61/319,686, filed on Mar. 31, 2010, provisional application No. 61/345,004, filed on May 14, 2010.

(51) Int. Cl.
*H04B 7/00* (2006.01)
*H04W 74/08* (2009.01)

(52) U.S. Cl.
CPC ................... *H04W 74/0816* (2013.01)

(58) Field of Classification Search
CPC .......... H04W 72/1205; H04W 72/121; H04W 72/1242; H04W 72/1278; H04W 72/1284; H04W 72/1289

USPC ................ 370/310, 328, 431, 432, 449; 709/227–229, 245
See application file for complete search history.

(56) References Cited

U.S. PATENT DOCUMENTS

| | | | |
|---|---|---|---|
| 7,028,097 B2 | 4/2006 | Bard | |
| 7,035,412 B2 * | 4/2006 | Lewis | 380/268 |

(Continued)

FOREIGN PATENT DOCUMENTS

| | | |
|---|---|---|
| CN | 1694458 A | 11/2005 |
| CN | 101180809 A | 5/2008 |

(Continued)

OTHER PUBLICATIONS

IEEE P802.11ac/D0.1, Jan. 2011, Draft Standard for Information Technology—Telecommunications and information exchange between systems—local and metropolitan area networks—Specific requirements Part 11: Wireless LAN Medium Access Control (MAC) and Physical Layer (PHY) specifications. Amendment 5: Enhancements for Very High Throughput for Operation in Bands below 6 GHz. pp. 1-193.

(Continued)

*Primary Examiner* — Dmitry H Levitan
(74) *Attorney, Agent, or Firm* — Dang M. Vo

(57) ABSTRACT

Certain aspects of the present disclosure relate to techniques for medium reservation in the case of multi-user (MU) communications. Multiple mechanisms are supported for protecting MU transmissions, wherein appropriate control messages can be exchanged between an access point and served user stations before transmitting downlink data packets.

58 Claims, 14 Drawing Sheets

(56) References Cited

U.S. PATENT DOCUMENTS

| | | | |
|---|---|---|---|
| 7,162,682 B2* | 1/2007 | Lewis | 714/776 |
| 7,321,762 B2 | 1/2008 | Hoeben | |
| 7,385,945 B1* | 6/2008 | Olson et al. | 370/328 |
| 7,522,552 B2* | 4/2009 | Fein et al. | 370/328 |
| 7,616,655 B2 | 11/2009 | Benveniste | |
| 7,653,043 B2 | 1/2010 | Sakoda | |
| 7,672,400 B2 | 3/2010 | Shapira et al. | |
| 7,701,920 B2* | 4/2010 | Takano | 370/348 |
| 7,852,791 B2* | 12/2010 | Nakajima et al. | 370/282 |
| 7,944,882 B2 | 5/2011 | Stephens | |
| 8,068,871 B2 | 11/2011 | Xhafa et al. | |
| 8,270,378 B2 | 9/2012 | Sun et al. | |
| 8,374,154 B2* | 2/2013 | Gong et al. | 370/334 |
| 8,705,383 B2* | 4/2014 | Liu et al. | 370/252 |
| 8,737,281 B2* | 5/2014 | Liu et al. | 370/312 |
| 8,861,490 B2* | 10/2014 | Uchida et al. | 370/338 |
| 2005/0002355 A1 | 1/2005 | Takano | |
| 2005/0259686 A1* | 11/2005 | Lewis | 370/469 |
| 2006/0221873 A1* | 10/2006 | Sharony | 370/278 |
| 2007/0297353 A1* | 12/2007 | Habetha et al. | 370/310 |
| 2008/0002615 A1 | 1/2008 | Nakajima et al. | |
| 2010/0067505 A1* | 3/2010 | Fein et al. | 370/338 |
| 2010/0177757 A1 | 7/2010 | Kim et al. | |
| 2010/0182987 A1 | 7/2010 | Shin et al. | |
| 2010/0309871 A1 | 12/2010 | Fischer et al. | |
| 2010/0316150 A1 | 12/2010 | Amini et al. | |
| 2010/0329236 A1 | 12/2010 | Sampath et al. | |
| 2011/0002319 A1* | 1/2011 | Husen et al. | 370/338 |
| 2011/0032875 A1 | 2/2011 | Erceg et al. | |
| 2011/0069628 A1 | 3/2011 | Liu et al. | |
| 2011/0149918 A1* | 6/2011 | Gong et al. | 370/336 |
| 2011/0150004 A1* | 6/2011 | Denteneer et al. | 370/476 |
| 2012/0076081 A1 | 3/2012 | Merlin et al. | |
| 2012/0087316 A1 | 4/2012 | Merlin et al. | |

FOREIGN PATENT DOCUMENTS

| | | |
|---|---|---|
| CN | 101321107 A | 12/2008 |
| JP | 2004328570 A | 11/2004 |
| JP | 2005102136 A | 4/2005 |
| JP | 2013515436 A | 5/2013 |
| WO | WO2009027931 A2 | 3/2009 |
| WO | WO-2011065750 A2 | 6/2011 |
| WO | 2011087579 A2 | 7/2011 |

OTHER PUBLICATIONS

Cai et al., "A Distributed Multi-User MIMO MAC Protocol for Wireless Local Area Networks", IEEE GLOBECOM Global Telecommunications Conference, Nov. 30, 2008, pp. 1-5, IEEE, XP031370635, ISBN: 978-1-4244-2324-8, DOI: 10.1109/GLOCOM.2008.ECP.952.

International Search Report and Written Opinion—PCT/US2011/030701, ISA/EPO—Jul. 8, 2011.

Joonsuk Kim et al., "GroupID Concept for Downlink MU-MIMO Transmission", Jan. 18, 2010, pp. Slide 1-Slide 8, XP002645417, Retrieved from the Internet: URL:https://mentor.ieee.org/.../11-10-0073-00-00ac-group-id-concept-for-dl-mu-mimo.p pt [retrieved on Jun. 28, 2011].

Mirkovic J et al: "Channel Aware Scheduling in MU-DCF WLANs",Wireless Communications, Networking and Mobile Computing, 2007. WICOM 2007.International Conference on, IEEE, Piscataway, NJ, USA, Sep. 21, 2007, pp. 1184-1187, XP031261477, ISBN: 978-1-4244-1311-9.

Kim, Y.J., et al., "IEEE 802.11-10/0335r0 : Considerations on MU-MIMO Protection in 11ac", Mar. 15, 2010, pp. Slide 1-Slide 11, XP002645416, Retrieved from the Internet: URL:https://mentor.ieee.org/.../11-10-0335-00-00ac-considerations-on-mu-mimo-protection-in-11ac.ppt [retrieved on Jun. 28, 2011].

IEEE 802.11 Working Group: "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE STD 802.11N-2009 (Amendment to IEEE STD 802.11-2007 As Amended by IEEE STD 802.11K-2008, IEEE STD 802.11R-2008, IEEE STD 802.11Y-2008, and IEEE STD 802.11W-2009, Sep. 11, Oct. 2009.

IEEE P802.11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput for Operation in Bands below 6 GHz, Jan. 2011, pp. 1-193.

"Documents", IEEE Mentor, pp. 1-3, Retrieved from the Internet: URL: https://mentor.ieee.org/802.11/documents[retrieved on Aug. 15, 2012]. XP007920946. (comprises internet page of list comprising uploads done in 2010 by working group TGac (https://mentor.ieee.org/802.11/documents?n=4&o=7a0d1d2d3d4a5a6a8a9a&is_group=00ac&is_year=2010), pp. 1-4.

IEEE P802.11ad/D1.0, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput in the 60GHz Band, Sep. 2010, pp. 1-385.

Jong-Ok Kim et al., "Enhancing MAC protocol for voice over IEEE 802.11 WLANs", Consumer Communications and Networking Conference, 2006, CCNC 2006, 20 06 3rd IEEE Las Vegas, NV, USA Jan. 8-10, 2006, Piscataway, NJ, USAJEEE, vol. 1, Jan. 8, 2006, pp. 45-49, XP010893128, DOI: DOI:10.1109/CCNC.2006.1592985, ISBN: 978-1-4244-0085-0.

\* cited by examiner

US 9,173,234 B2

PROTECTION MECHANISMS FOR MULTI-USER MIMO TRANSMISSIONS

CLAIM OF PRIORITY UNDER 35 U.S.C. §119

The present application for patent claims benefit of U.S. Provisional Patent Application Ser. No. 61/319,686, filed Mar. 31, 2010, and U.S. Provisional Patent Application Ser. No. 61/345,004, filed May 14, 2010 and assigned to the assignee hereof and hereby expressly incorporated by reference herein.

CROSS REFERENCE TO RELATED APPLICATIONS

The present application for patent is related by subject matter to U.S. patent application Ser. No. 13/076,083 and U.S. patent application Ser. No. 13/076,113, filed herewith and assigned to the assignee hereof and hereby expressly incorporated by reference herein.

BACKGROUND

1. Field

Certain aspects of the present disclosure generally relate to wireless communications and, more particularly, to methods and apparatus for medium reservation in the case of multi-user transmissions.

2. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In IEEE 802.11 networks, transmissions can occur by following a random medium access mechanism called Carrier Sense Multiple Access with Collision Avoidance (CSMA/CA). Transmissions from one node can happen concurrently with transmissions from other nodes in the network, and this situation can be referred to as a collision. The CSMA/CA mechanism tries to avoid collisions by having nodes (i.e., user stations (STAs)) sense the medium before starting a transmission in order to ensure that no other STA is already transmitting. In some configurations, not all the STAs are able to hear each other, and the sensing mechanism can fail. This can be referred to as the hidden node scenario. In order to limit the latter case, the concept of Network Allocation Vector (NAV) is present in the IEEE 802.11 standard, wherein NAV information may comprise an indication of time for which the medium is going to be busy. This indication may be relied to the hidden nodes by using appropriate messages.

The IEEE 802.11 standard specifies the use of Request-to-send/Clear-to-send (RTS/CTS) messages to provide the NAV information to hidden node(s), and hence provide protection for the immediately following transmission. The RTS/CTS mechanism can be also useful in lowering the overhead caused by collisions. If an RTS message is transmitted before the data and a collision happens, then the CTS message will be missing, which allows to identify the collision event. Also the RTS message is typically much shorter message than data, and hence the time taken by the collision is short.

The RTS/CTS mechanism can also allow detecting the NAV being set by neighboring networks, which may be hidden to the transmitter. If a CTS message is not received, the reason can be that the NAV for the RTS receiver was set, preventing the RTS receiver to reply with a CTS message.

A Multi-User MIMO (MU-MIMO) transmission in IEEE 802.11 networks may comprise data destined to multiple STAs scheduled for simultaneous transmission. In this case, efficient protection of the MU-MIMO transmission is desired.

SUMMARY

Certain aspects of the present disclosure provide an apparatus for wireless communications. The apparatus generally includes a transmitter configured to transmit a reservation message to a plurality of apparatuses to reserve a medium for data communication, and a receiver configured to receive, on a channel, a plurality of confirmation messages transmitted simultaneously on the channel from two or more of the apparatuses in response to the reservation message, wherein the confirmation messages comprise a substantially same waveform, wherein the transmitter is also configured to transmit data over the medium to the two or more apparatuses in response to the confirmation messages.

Certain aspects of the present disclosure provide a method for wireless communications. The method generally includes transmitting a reservation message to a plurality of apparatuses to reserve a medium for data communication, receiving, on a channel, a plurality of confirmation messages transmitted simultaneously on the channel from two or more of the apparatuses in response to the reservation message, wherein the confirmation messages comprise a substantially same waveform, and transmitting data over the medium to the two or more apparatuses in response to the confirmation messages.

Certain aspects of the present disclosure provide an apparatus for wireless communications. The apparatus generally includes means for transmitting a reservation message to a plurality of apparatuses to reserve a medium for data communication, and means for receiving, on a channel, a plurality of confirmation messages transmitted simultaneously on the channel from two or more of the apparatuses in response to the reservation message, wherein the confirmation messages comprise a substantially same waveform, wherein the means for transmitting is further configured to transmit data over the medium to the two or more apparatuses in response to the confirmation messages.

Certain aspects of the present disclosure provide a computer-program product for wireless communications. The computer-program product includes a computer-readable medium comprising instructions executable to transmit a reservation message to a plurality of apparatuses to reserve a medium for data communication, receive, on a channel, a plurality of confirmation messages transmitted simultaneously on the channel from two or more of the apparatuses in response to the reservation message, wherein the confirmation messages comprise a substantially same waveform, and transmit data over the medium to the two or more apparatuses in response to the confirmation messages.

Certain aspects of the present disclosure provide an access point. The access point generally includes at least one antenna, a transmitter configured to transmit, via the at least one antenna, a reservation message to a plurality of access terminals to reserve a medium for data communication, and a receiver configured to receive, on a channel via the at least one antenna, a plurality of confirmation messages transmitted simultaneously on the channel from two or more of the access terminals in response to the reservation message, wherein the confirmation messages comprise a substantially same waveform, wherein the transmitter is also configured to transmit data, over the medium via the at least one antenna, to the two or more access terminals in response to the confirmation messages.

Certain aspects of the present disclosure provide an apparatus for wireless communications. The apparatus generally includes a receiver configured to receive, at the apparatus of a plurality of apparatuses, a reservation message transmitted to the plurality of apparatuses for reserving a medium for communicating data, and a transmitter configured to transmit, in response to the reservation message, a confirmation message simultaneously with transmitting one or more other confirmation messages from one or more of the apparatuses, wherein all the transmitted confirmation messages comprise a substantially same waveform transmitted on a channel, wherein the receiver is also configured to receive data dedicated to the apparatus.

Certain aspects of the present disclosure provide a method for wireless communications. The method generally includes receiving, at an apparatus of a plurality of apparatuses, a reservation message transmitted to the plurality of apparatuses for reserving a medium for communicating data, transmitting, in response to the reservation message, a confirmation message simultaneously with transmitting one or more other confirmation messages from one or more of the apparatuses, wherein all the transmitted confirmation messages comprise a substantially same waveform transmitted on a channel, and receiving data dedicated to the apparatus.

Certain aspects of the present disclosure provide an apparatus for wireless communications. The apparatus generally includes means for receiving, at the apparatus of a plurality of apparatuses, a reservation message transmitted to the plurality of apparatuses for reserving a medium for communicating data, and means for transmitting, in response to the reservation message, a confirmation message simultaneously with transmitting one or more other confirmation messages from one or more of the apparatuses, wherein all the transmitted confirmation messages comprise a substantially same waveform transmitted on a channel, wherein the means for receiving is further configured to receive data dedicated to the apparatus.

Certain aspects of the present disclosure provide a computer-program product for wireless communications. The computer-program product includes a computer-readable medium comprising instructions executable to receive, at an apparatus of a plurality of apparatuses, a reservation message transmitted to the plurality of apparatuses for reserving a medium for communicating data, transmit, in response to the reservation message, a confirmation message simultaneously with transmitting one or more other confirmation messages from one or more of the apparatuses, wherein all the transmitted confirmation messages comprise a substantially same waveform transmitted on a channel, and receive data dedicated to the apparatus.

Certain aspects of the present disclosure provide an access terminal. The access terminal generally includes at least one antenna, a receiver configured to receive, at the access terminal of a plurality of access terminals via the at least one antenna, a reservation message transmitted to the plurality of access terminals for reserving a medium for communicating data, and a transmitter configured to transmit, in response to the reservation message via the at least one antenna, a confirmation message simultaneously with transmitting one or more other confirmation messages from one or more of the access terminals, wherein all the transmitted confirmation messages comprise a substantially same waveform transmitted on a channel, wherein the receiver is also configured to receive data dedicated to the access terminal via the at least one antenna.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
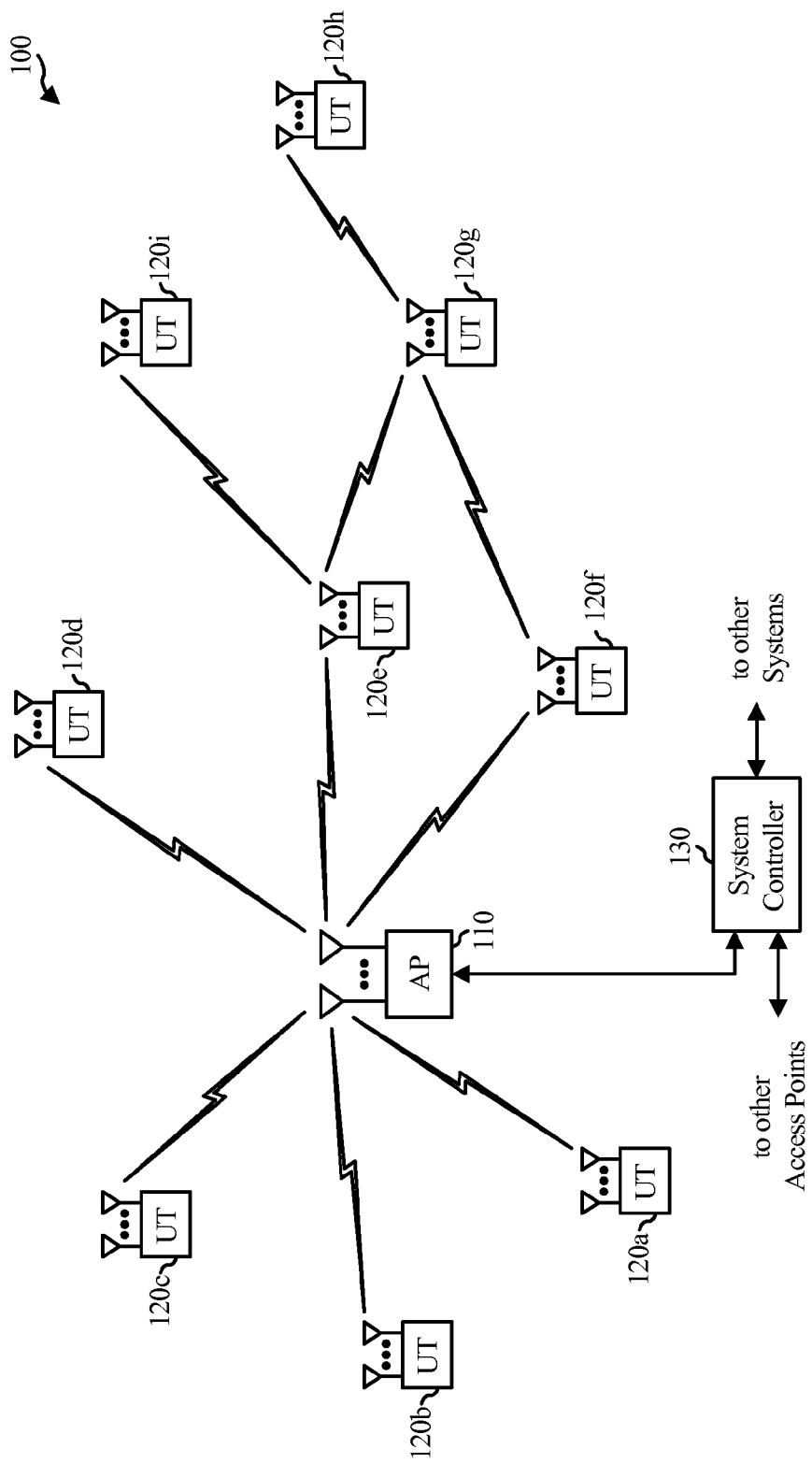
FIG. 1 illustrates an example wireless communications network in accordance with certain aspects of the present disclosure.

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

According to certain aspects of the present disclosure, one or more control messages may be exchanged between the access point 110 and one or more of the user terminals 120 for protecting downlink multiuser transmissions over an accompanied wireless medium. The exchanged control messages may comprise at least one of Request-to-send (RTS) message(s) or Clear-to-send (CTS) message(s) providing Network Allocation Vector (NAV) information to node(s) not visible to the access point (i.e., hidden node(s)), wherein the NAV information may comprise an indication of time for which the medium will be busy. This mechanism may reduce a probability of collisions during data transmissions.

Figure 2:
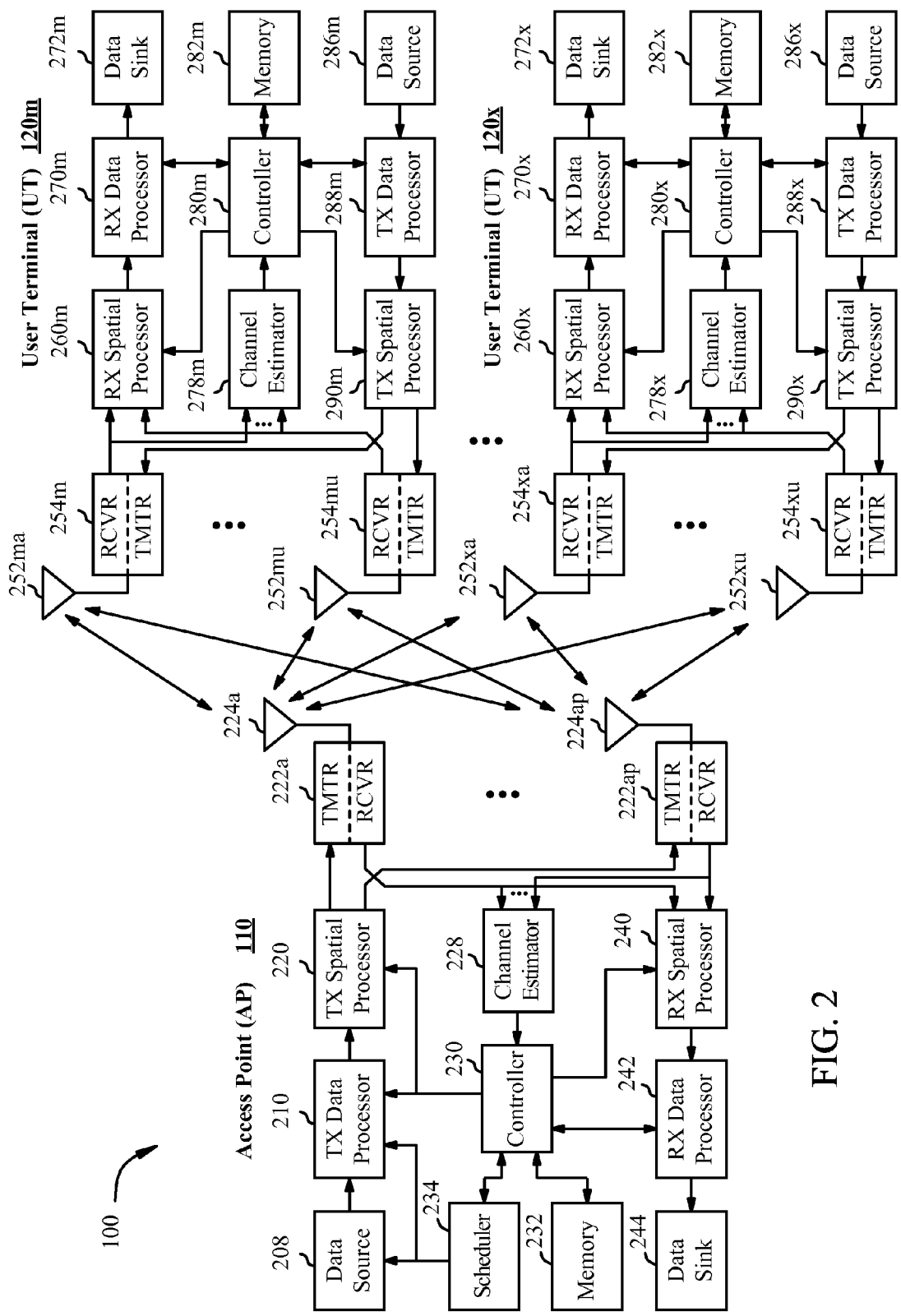
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, one or more control messages may be exchanged between the transceiver 222 of the access point 110 and the transceivers 254 of user terminals 120 in order to protect following downlink multiuser transmissions. As aforementioned, the exchanged control messages may comprise at least one of RTS message(s) or CTS message(s) providing the NAV information to the hidden node(s) of the wireless communication system 100.

Figure 3:
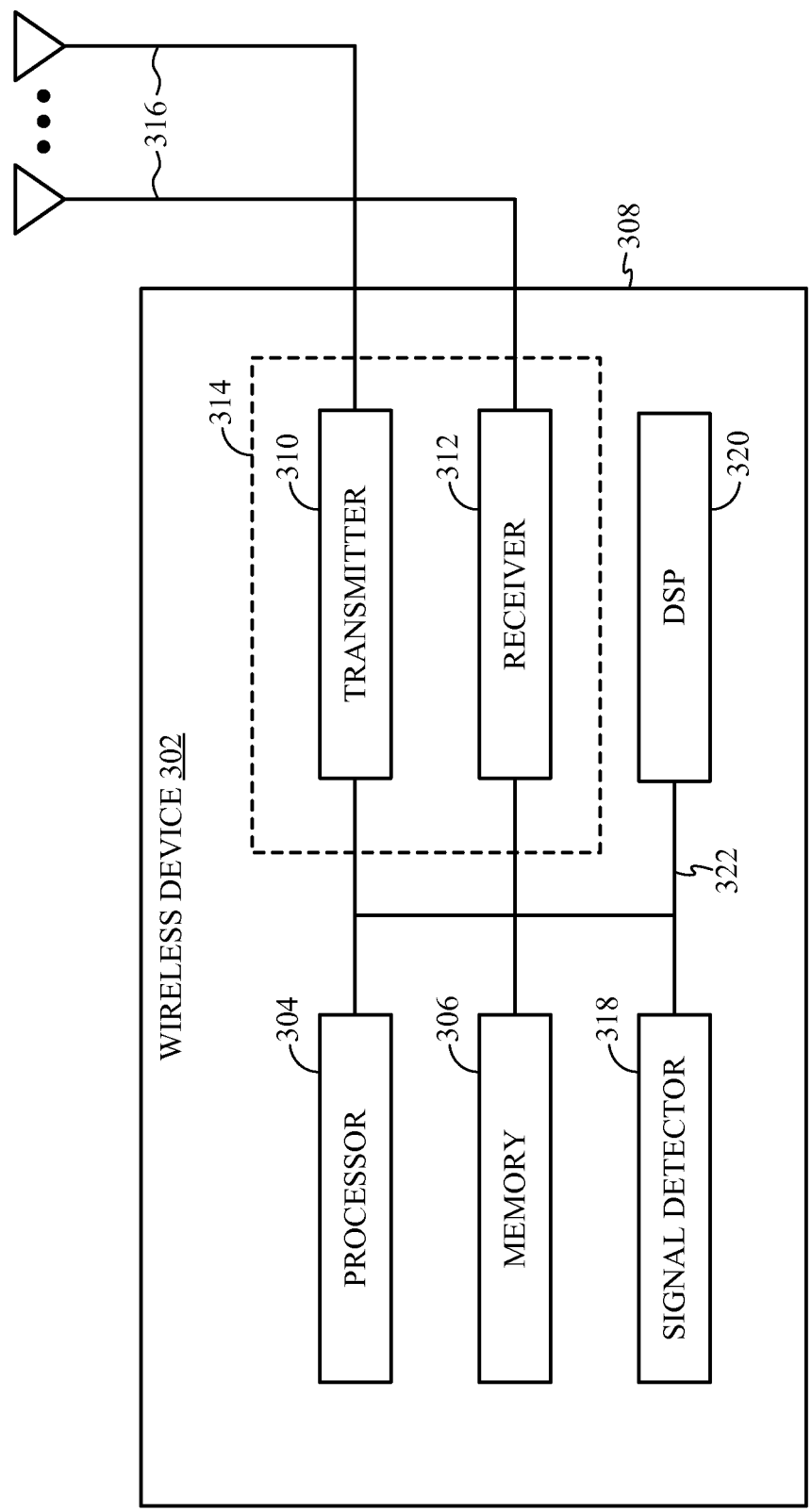
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

According to certain aspects of the present disclosure, one or more control messages may be exchanged between the wireless device 302 and one or more other wireless devices (not shown in FIG. 3) for protection of following downlink multiuser transmissions. As aforementioned, the exchanged control messages may comprise at least one of RTS message(s) or CTS message(s) providing the NAV information to the hidden node(s) in the wireless communication system 100 comprising the wireless device 302.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SC-FDMA and combinations thereof.

In next generation Wireless Local Area Network (WLAN) systems based on the IEEE 802.11, an access point (AP) (e.g., the access point 110 from FIG. 1) may transmit data simultaneously to multiple stations (STAs) (e.g., to the user terminals 120 from FIG. 1) using multiuser multiple-input multiple-output (MU-MIMO) transmission scheme based on, for example, Downlink Spatial Division Multiple Access (DL-SDMA). However, prior to such transmission, the AP may transmit a request-to-send (RTS) message to a plurality of STAs to reserve a medium for data communication. The plurality of STAs may be required to respond with clear-to-send (CTS) messages, if they are to be protected from other STAs that may not hear the RTS message sent from the AP (i.e., these other STAs may represent hidden nodes).

Protection Mechanisms for Multiuser MIMO Transmissions

Certain aspects of the present disclosure support multiple mechanisms for protecting a MU-MIMO transmission, by using appropriate control messages exchanged between an AP and supported user STAs before transmitting downlink data packets.

In an aspect of the present disclosure, a plurality of STAs addressed in an RTS message transmitted from an AP may be configured to simultaneously transmit CTS messages. In order to ensure that such simultaneously transmitted CTS messages can be correctly decoded at one or more other STAs (e.g., at hidden nodes), a physical layer waveform that each of the transmitting STAs produce may need to be substantially the same. The process of generating substantially the same waveform at each of the STAs addressed in the RTS message may involve several aspects.

In one aspect, it may be required to ensure that all CTS messages transmitted from all STAs addressed in the RTS message may comprise exactly the same bits. This can be ensured in IEEE 802.11 since only a variable part of CTS message may comprise a destination address, and each simultaneously transmitted CTS message may be transmitted to the same AP carrying therefore the same AP's destination address. Further, identical modulation and coding schemes may need to be utilized at each STA before over-the-air CTS transmission. In the IEEE 802.11, this may be ensured since each of the CTS messages may be communicated at a basic rate specified by the AP.

In another aspect, it may be required to ensure that the physical layer process of encoding and scrambling before over-the-air CTS transmission generates same bits. In IEEE 802.11, each STA may choose its own scrambling sequence. Therefore, additional specification may need to be added so that all the CTS messages generated at the plurality of STAs in response to the RTS message may be scrambled using the same scrambling sequence.

Figure 4:
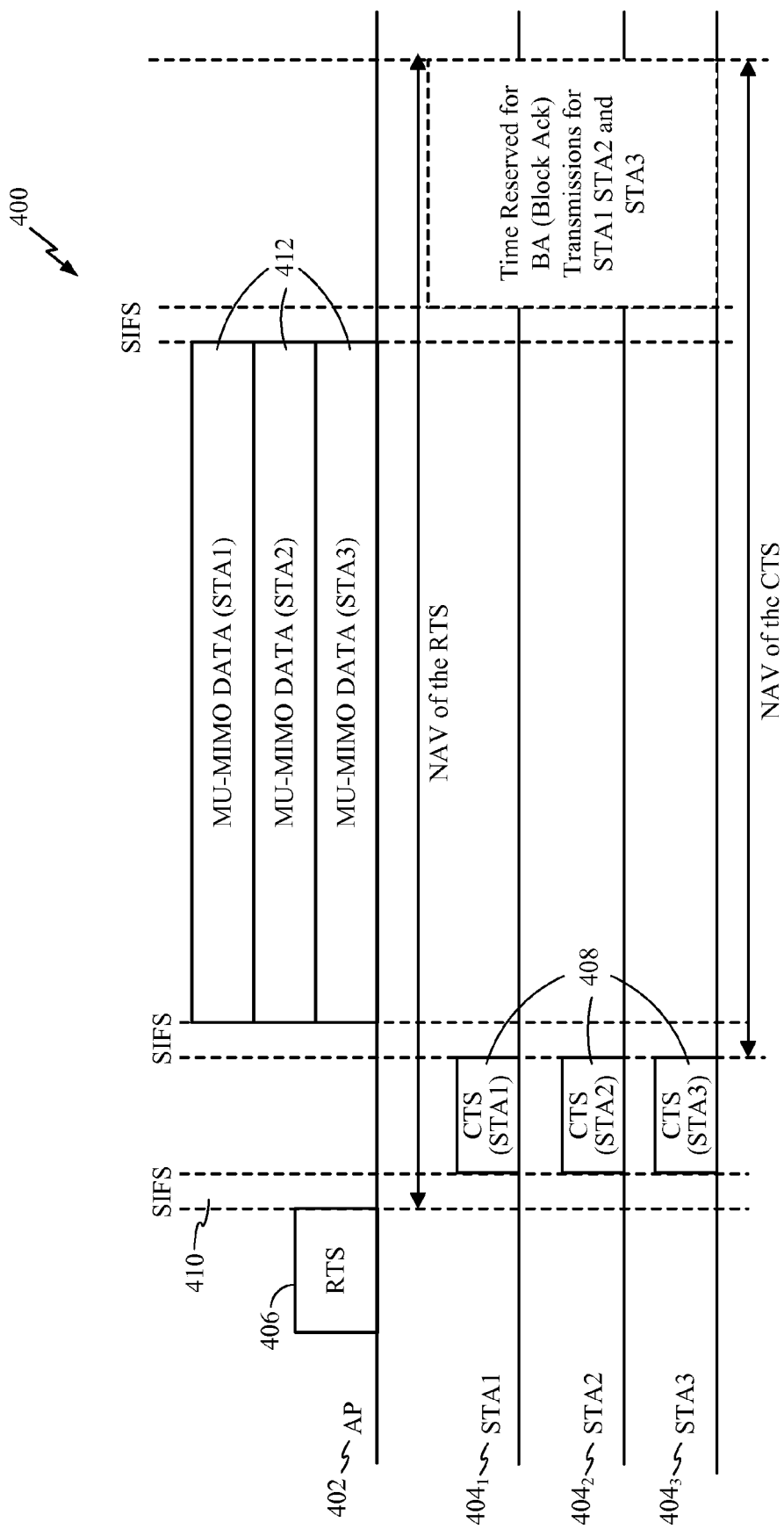
FIG. 4 illustrates a first example exchange of control messages preceding multiuser multiple-input multiple-output (MU-MIMO) transmission in accordance with certain aspects of the present disclosure.

FIG. 4 illustrates an example Request-to-send/Clear-to-send (RTS/CTS) based medium reservation protocol 400 with stacked CTS messages for MU-MIMO communication in accordance with certain aspects of the present disclosure. An access point (AP) 402 may transmit an RTS message 406 comprising a group address that addresses a plurality of STAs. A subset or all of the STAs (e.g., STAs $404_1$, $404_2$, $404_3$) addressed by the AP 402 that can receive a downlink MU-MIMO transmission may then simultaneously respond with CTS transmissions 408 starting SIFS (short inter-frame space) time-period 410 after receiving the RTS message 406. Duration fields of the simultaneously transmitted CTS messages 408 may be set, for example, according to a duration field specified by the RTS message 406.

In an aspect of the present disclosure, the AP 402 may specify one or more parameters in a management message to ensure that the CTS messages 408 may comprise a substantially same waveform when being simultaneously transmitted from the STAs 4041-4043. The management message may be transmitted from the AP 402 and may be received at the plurality of STAs addressed by the RTS message 406 prior to simultaneously transmitting the CTS messages 408. One of the specified parameters in the management message may indicate a scrambling sequence to be applied at each of the STAs 4041-4043 before transmitting the CTS messages 408. The scrambling sequence applied at all the STAs may be pre-determined (e.g., by the IEEE 802.11 standard body) and stored at each STA to be used when transmitting a CTS message.

The AP 402 may start downlink MU-MIMO transmissions 412 after the AP 402 has received the CTS messages 408 from the STAs $404_1$-$404_3$. Because of the same waveforms, the CTS messages 408 transmitted from the plurality of STAs may appear as a single physical layer frame at one or more other STAs listening to the reserved medium. Therefore, these other STAs may be able to accurately decode the CTS messages 408, and then properly set their Network Allocation Vector (NAV) counters according to a duration field value of the decoded CTS messages.

In an aspect, each of the CTS messages 408 may be transmitted on a different spatial stream as specified in the RTS message 406. In another aspect, if none of the STAs transmits a CTS message in response to the RTS message 406, then the AP 402 may terminate the protocol 400 and may go into a back-off state to save power.

In an aspect, multiple STAs (e.g., the STAs $404_1$-$404_3$) receiving the RTS message 406 may need to know that they are required to reply with CTS messages. A normal action frame may be, for example, utilized for transmitting the RTS message 406 since the NAV may be set by any data frame. Transmitting a single RTS message may also have the advantage of NAV truncation. The AP 402 receiving the CTS messages 408 may not know which STA(s) transmitted it. As long as one of the STAs transmits a CTS messages, then the AP may assume that there was no collision.

Figure 5:
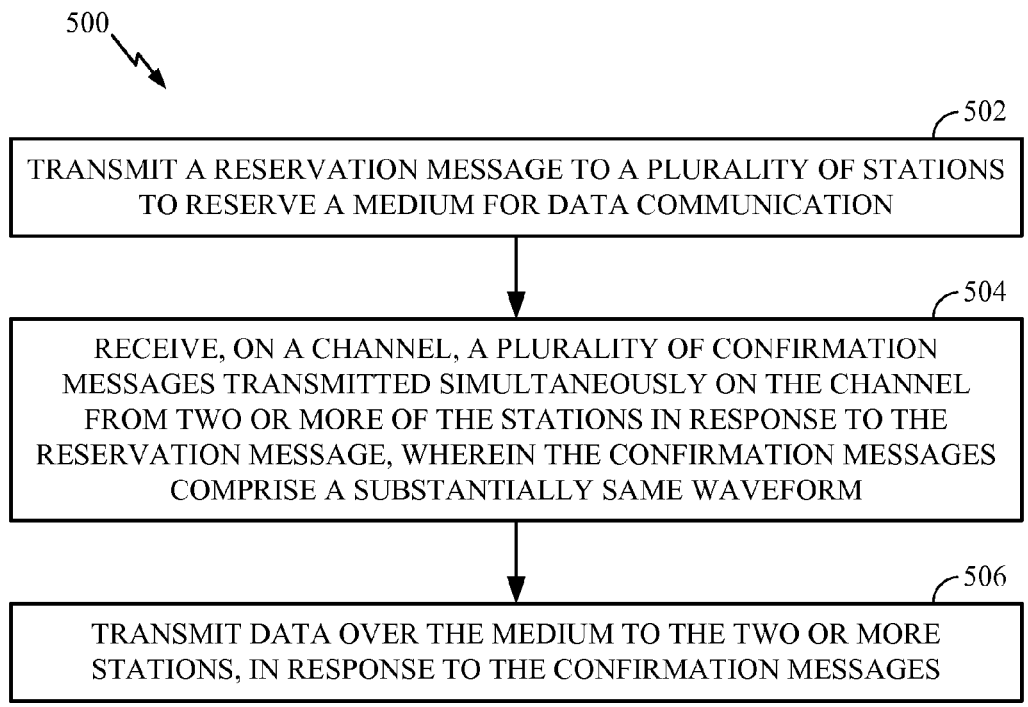
FIG. 5 illustrates first example operations that may be performed at an access point in accordance with certain aspects of the present disclosure.
Figure 5A:
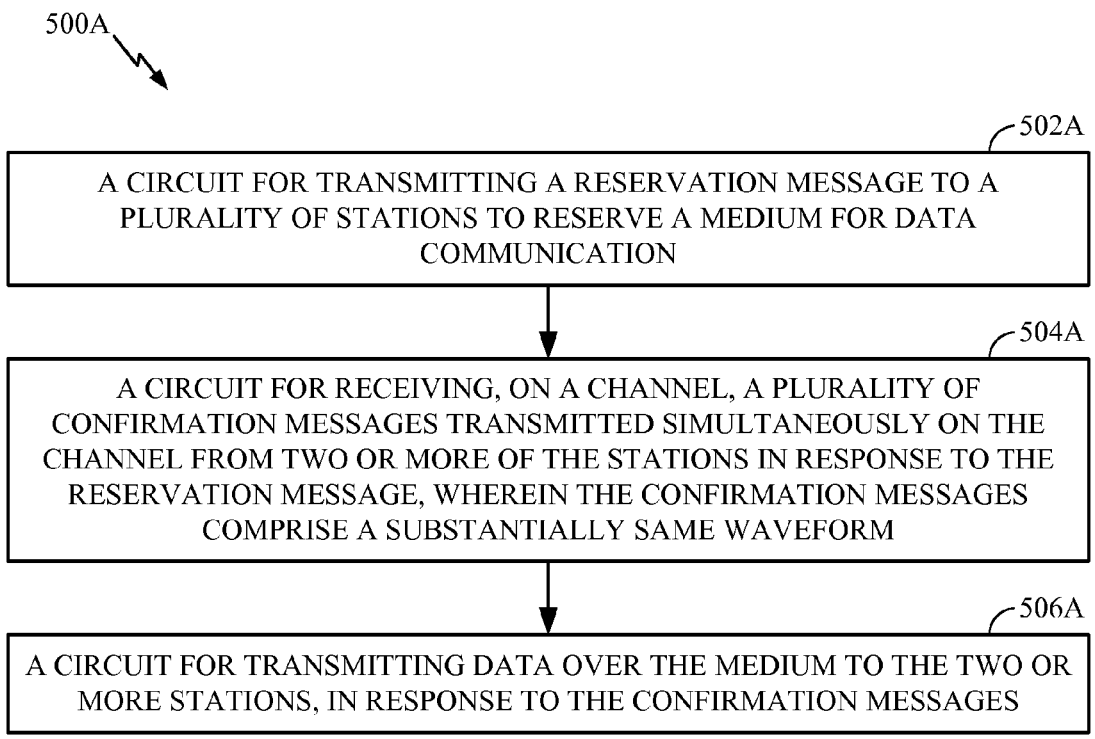
FIG. 5A illustrates example components capable of performing the operations illustrated in FIG. 5.

FIG. 5 illustrates example operations 500 that may be performed at an access point (e.g., at the access point 402 from FIG. 4) in accordance with certain aspects of the present disclosure. At 502, the access point may transmit a reservation message to a plurality of user stations (e.g., the STAs $404_1$-$404_3$ from FIG. 4) to reserve a medium for data communication. At 504, the access point may receive, on a channel, a plurality of confirmation messages transmitted simultaneously on the channel from two or more of the user stations in response to the reservation message, wherein the confirmation messages may comprise a substantially same waveform. At 506, in response to the confirmation messages, the access point may transmit data over the medium to the two or more user stations. In an aspect, the data transmitted to the two or more user stations may comprise a Multi User Multiple Input Multiple Output Very High Throughput Physical layer convergence procedure Protocol Data Unit (MU-MIMO VHT PPDU).

In an aspect, the reservation message may have a format substantially the same as an IEEE 802.11 request-to-send (RTS) message format. Further, each of the simultaneously transmitted confirmation messages may have a format substantially the same as an IEEE 802.11 clear-to-send (CTS) message format.

Figure 6:
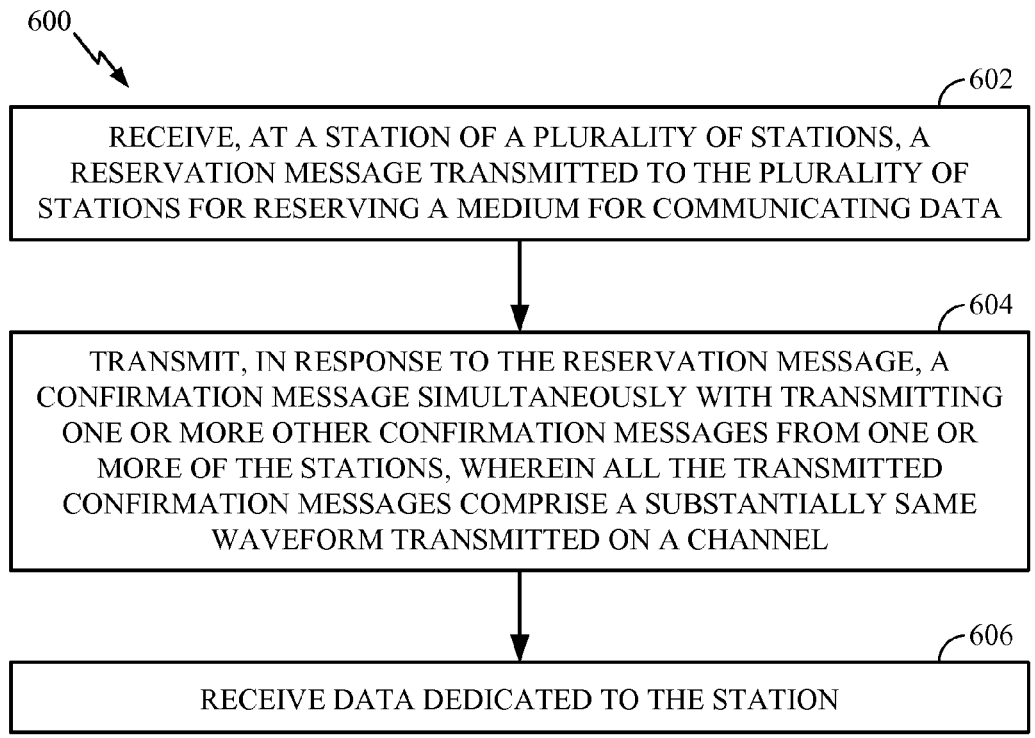
FIG. 6 illustrates first example operations that may be performed at a user station in accordance with certain aspects of the present disclosure.
Figure 6A:
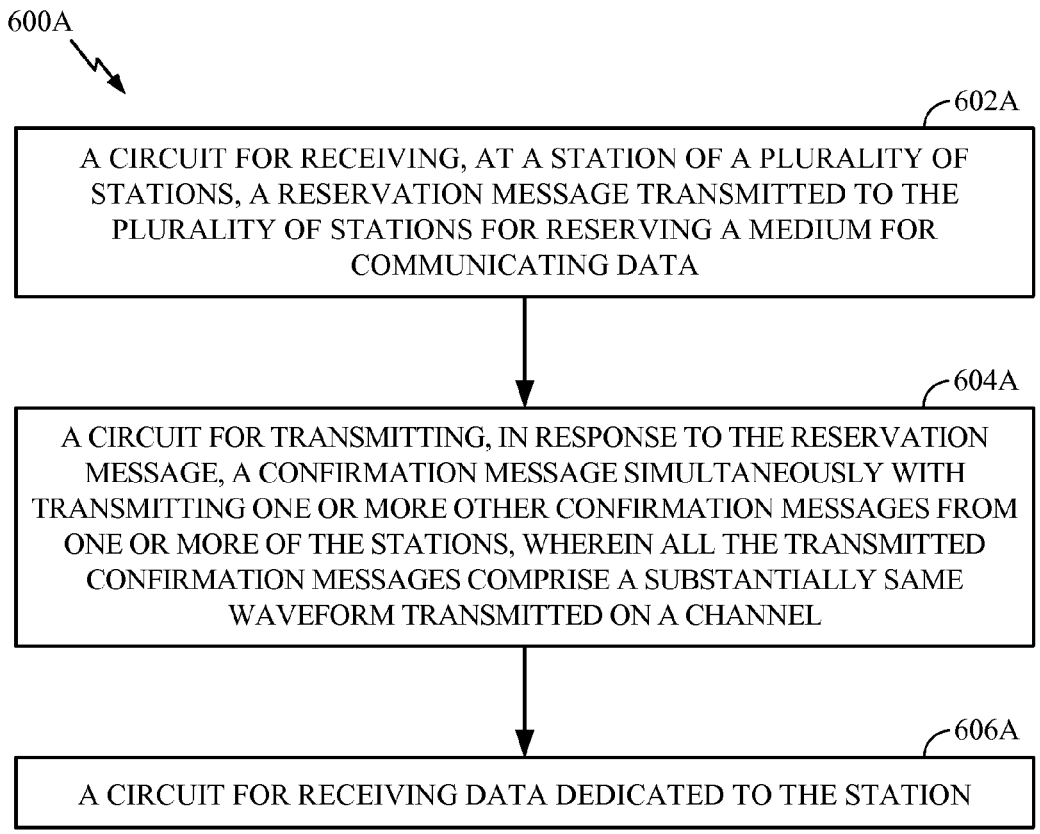
FIG. 6A illustrates example components capable of performing the operations illustrated in FIG. 6.

FIG. 6 illustrates example operations 600 that may be performed at a user station (e.g., at one of the STAs $404_1$-$404_3$ from FIG. 4) in accordance with certain aspects of the present disclosure. At 602, the user station of a plurality of user stations may receive a reservation message transmitted to the plurality of user stations for reserving a medium for communicating data. At 604, in response to the reservation message, the user station may transmit a confirmation message simultaneously with transmitting one or more other confirmation messages from one or more of the user stations, wherein all the transmitted confirmation messages may comprise a substantially same waveform transmitted on a channel. At 606, the user station may receive data dedicated to that station.

In an aspect, the received reservation message may comprise an RTS message including a multicast group address of the user stations. Each of the user stations may identify, based on the multicast group address, that data to be transmitted are addressed to that particular user station.

In order for the aforementioned scheme to be effective, it may be required to assign a group address that captures STAs that will be receiving MU-MIMO data. It should be noted that if the group address encompasses too many STAs, then it may not be possible to discern states at the STAs for which data are to be sent (e.g., the STAs $404_1$-$404_3$ from FIG. 4).

In one aspect of the present disclosure, an AP may construct a unique group address for a given subset of STAs. Then, the AP may communicate the group address to the subset of STAs using a management message prior to transmitting the RTS message. Each STA from the subset of STAs may receive the management frame comprising the unique group address, and may identify based on the unique group address that data to be transmitted from the AP are addressed to that particular STA.

In another aspect of the present disclosure, the AP may use, for example, a known hash function to map Media Access Control (MAC) addresses or Association Identifications (IDs) of a desired set of STAs to a group MAC address. The group MAC address may be transmitted by the AP to the set of STAs within a management message prior to transmitting the RTS message. Then, a STA from the set of STAs receiving the management message with the group MAC address may use a reverse mapping (de-map) of the known hash function to determine whether the group MAC address actually addresses that STA (i.e., to obtain an identification of that STA). It should be noted that such hash function may need to be restrictive enough to exclude all STAs except those that comprise data addressed to them.

Figure 7:
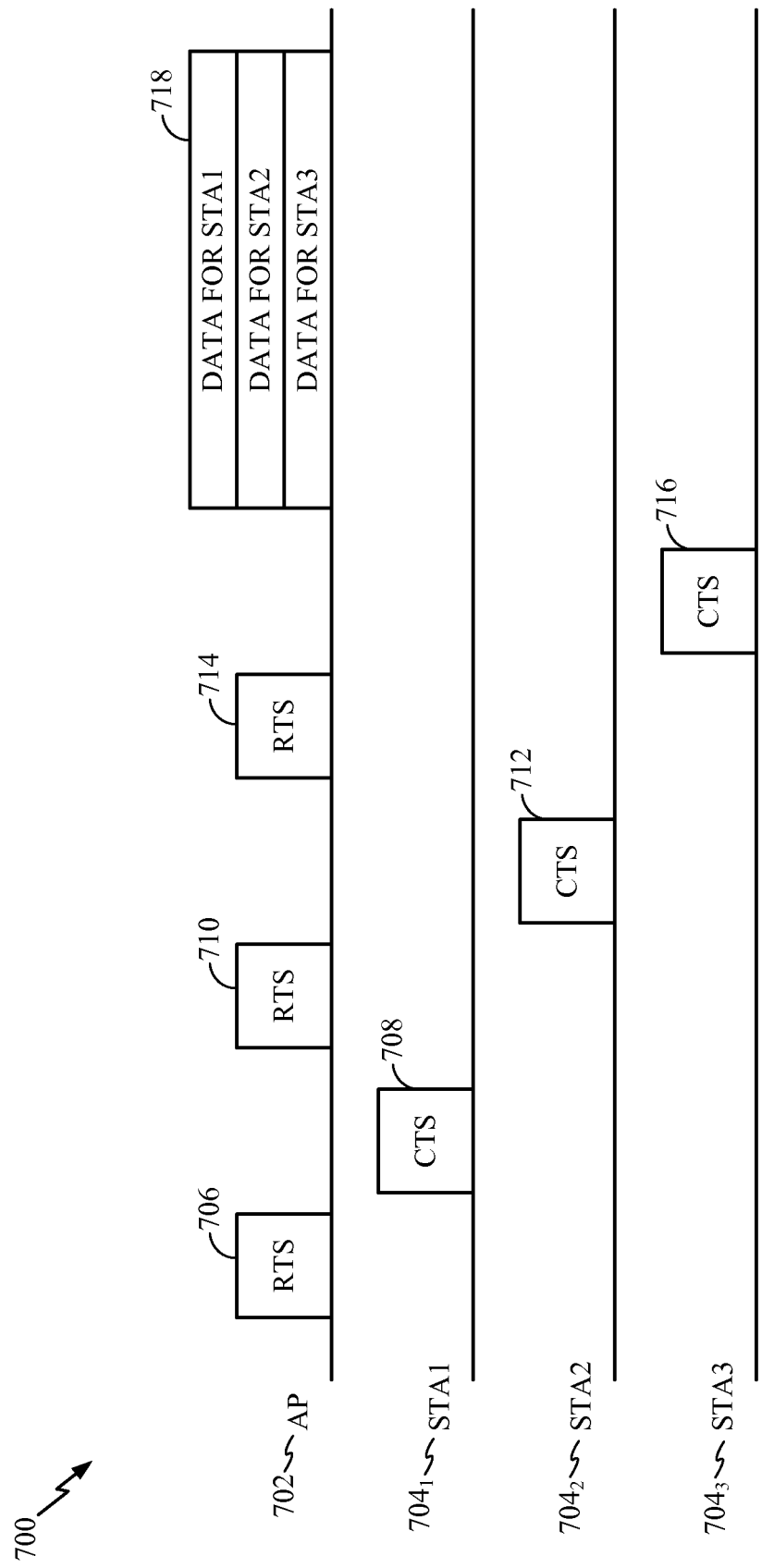
FIG. 7 illustrates a second example exchange of control messages preceding MU-MIMO transmission in accordance with certain aspects of the present disclosure.

In another aspect of the present disclosure, an AP and a plurality of STAs may exchange multiple RTS and CTS messages transmitted sequentially. FIG. 7 illustrates an example RTS/CTS based medium reservation protocol 700 with sequential transmissions of RTS and CTS messages for MU-MIMO communication in accordance with certain aspects of the present disclosure.

As illustrated in FIG. 7, an AP 702 may transmit an RTS message 706 to a STA $704_1$. Then, the STA $704_1$ may respond with a CTS transmission 708 that may start SIFS time after receiving the RTS message 706. After that, the AP 702 may transmit an RTS message 710 to another STA $704_2$, and the STA $704_2$ may respond with a CTS transmission 712. Following this, the AP 702 may transmit an RTS message 714 to a third STA $704_3$, and the STA $704_3$ may respond with a CTS transmission 716. Once the control messages 706-716 have been exchanged between the AP 702 and the STAs $704_1$, $704_2$, $704_3$, the medium may be reserved for all the STAs $704_1$-$704_3$. Then, the AP 702 may start downlink MU-MIMO transmissions 718 to the STAs $704_1$-$704_3$.

Figure 8:
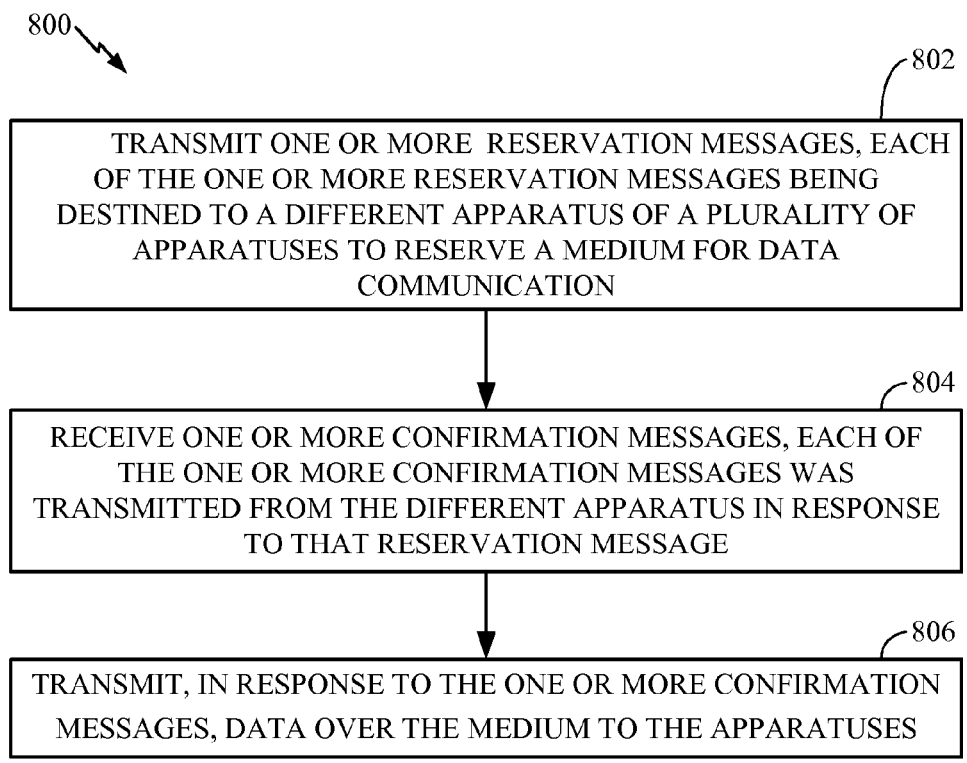
FIG. 8 illustrates second example operations that may be performed at an access point in accordance with certain aspects of the present disclosure.
Figure 8A:
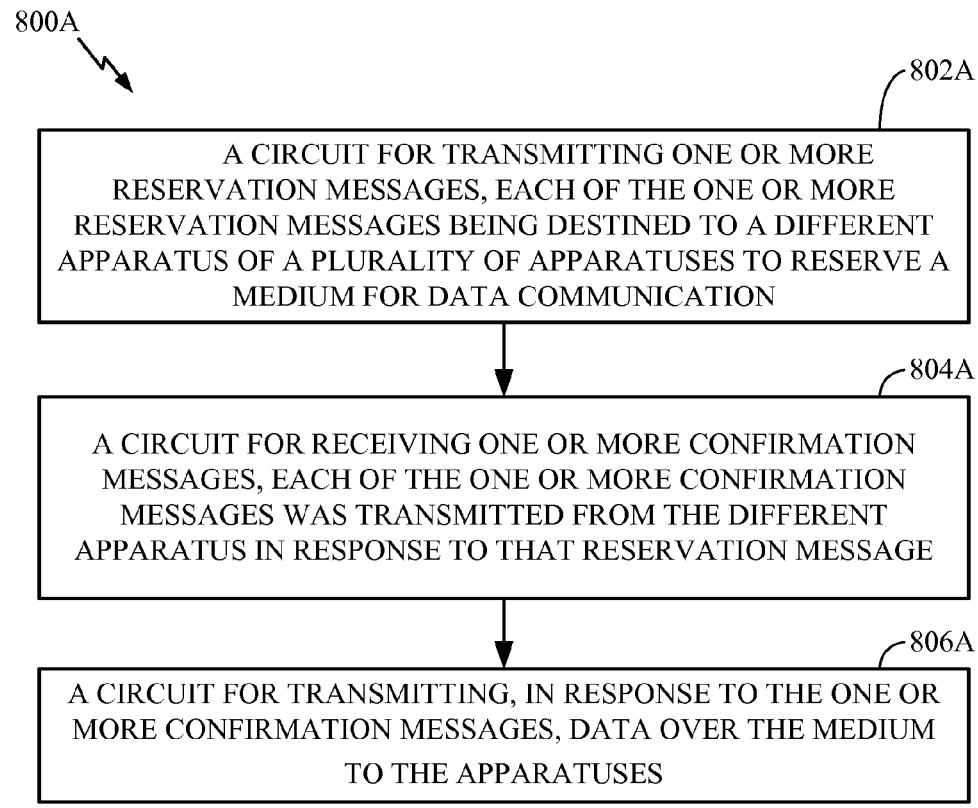
FIG. 8A illustrates example components capable of performing the operations illustrated in FIG. 8.

FIG. 8 illustrates example operations 800 that may be performed at an AP (e.g., the AP 702 from FIG. 7) in accordance with certain aspects of the present disclosure. At 802, the AP may transmit one or more reservation messages, each of the one or more reservation messages being destined to a different STA of a plurality of STAs to reserve a medium for data communication. At 804, the AP may receive one or more confirmation messages, each of the one or more confirmation messages was transmitted from the different STA in response to that reservation message. At 806, in response to the one or more confirmation messages, the AP may transmit data over the medium to the STAs. In an aspect, the data transmitted to the STAs may comprise an MU-MIMO VHT PPDU.

In an aspect, the reservation messages may be transmitted sequentially, and the confirmation messages may be transmitted sequentially as well. Further, transmitting each of the reservation messages may immediately precede transmission of a different one of the confirmation messages, as illustrated in FIG. 7.

Figure 9:
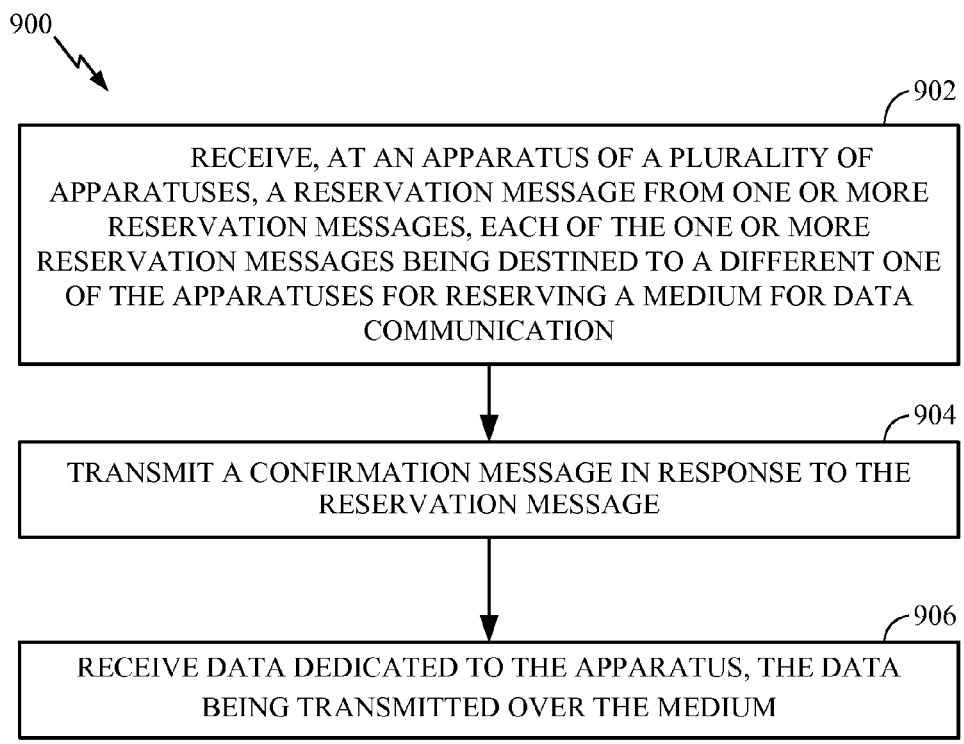
FIG. 9 illustrates second example operations that may be performed at a user station in accordance with certain aspects of the present disclosure.
Figure 9A:
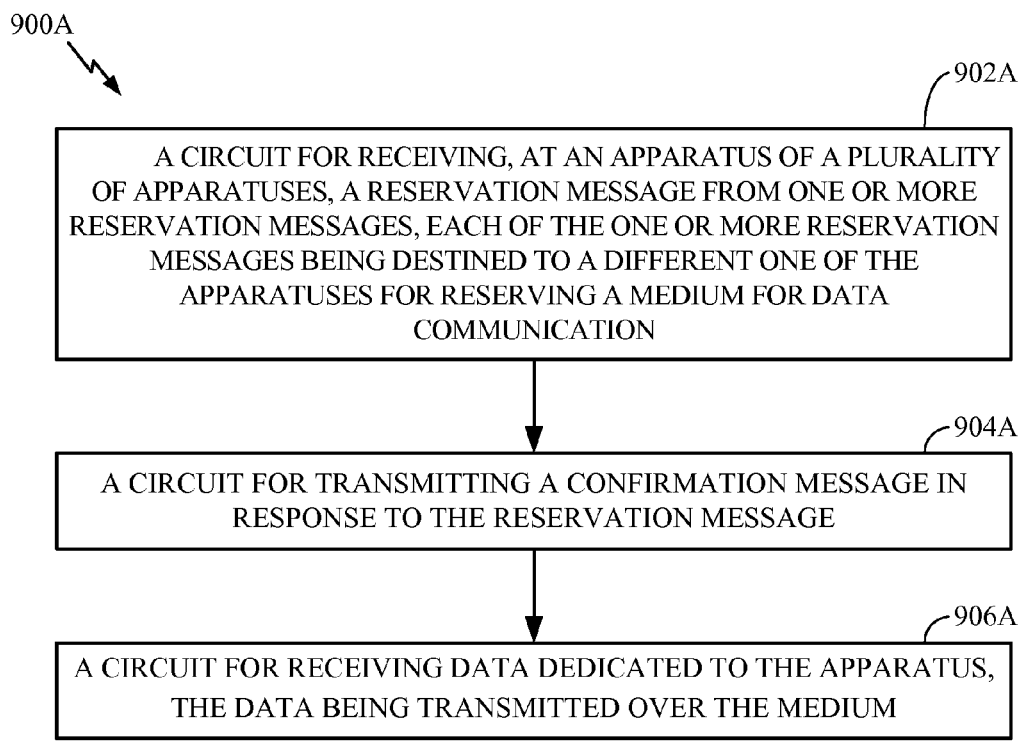
FIG. 9A illustrates example components capable of performing the operations illustrated in FIG. 9.

FIG. 9 illustrates example operations 900 that may be performed at a STA in accordance with certain aspects of the present disclosure. At 902, the STA of a plurality of STAs may receive a reservation message from one or more reservation messages, each of the one or more reservation messages being destined to a different one of the STAs for reserving a medium for data communication. At 904, the STA may transmit a confirmation message in response to the reservation message. At 906, the STA may receive data dedicated to that STA, the data being transmitted over the medium.

In an aspect, the STA may be configured to count a number of one or more other confirmation messages previously transmitted from one or more other STAs of the plurality of STAs to determine when to transmit the confirmation message. Further, the STA may be able to detect the one or more other confirmation messages. In one aspect, the confirmation message may be transmitted immediately after receiving the reservation message. In another aspect, the confirmation message may be transmitted according to a scheduled time specified in the reservation message.

Figure 10:
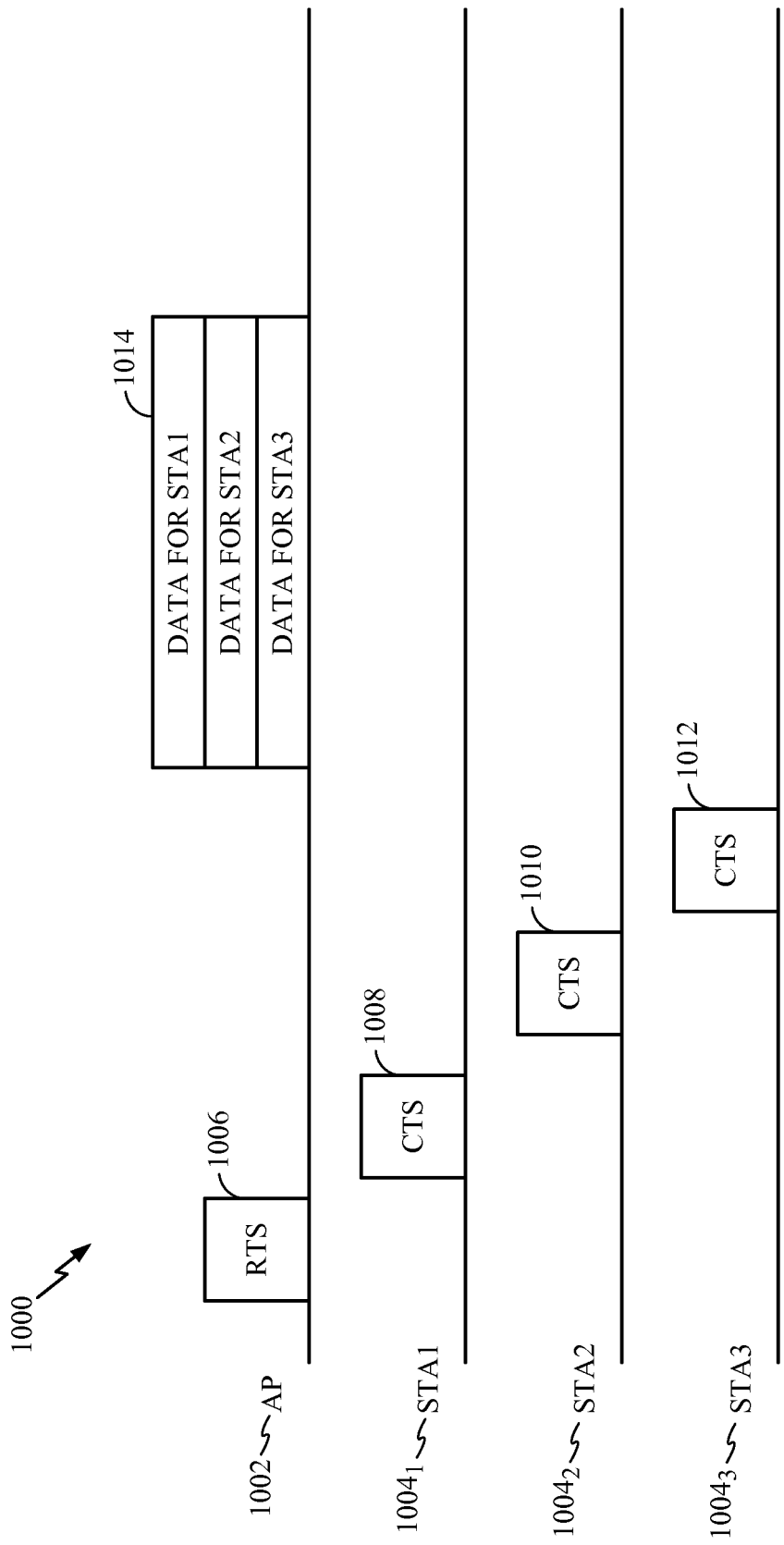
FIG. 10 illustrates a third example exchange of control messages preceding MU-MIMO transmission in accordance with certain aspects of the present disclosure.

FIG. 10 illustrates an example RTS/CTS based medium reservation protocol 1000 with a single RTS transmission and sequential transmissions of CTS messages for protecting MU-MIMO communication in accordance with certain aspects of the present disclosure. As illustrated in FIG. 10, an AP 1002 may transmit an RTS message 1006 (e.g., a broadcast message) to a plurality of STAs $1004_1$, $1004_2$, $1004_3$. Then, the STA $1004_1$ may respond with a CTS transmission 1008, followed by a CTS transmission 1010 from the STA $1004_2$, and a CTS transmission 1012 from the STA $1004_3$.

Once the control messages 1006, 1008, 1010 and 1012 have been exchanged between the AP 1002 and the STAs $1004_1$-$1004_3$, the medium may be reserved for all the STAs $1004_1$-$1004_3$. Then, the AP 1002 may start downlink MU-MIMO transmissions 1014 to the STAs $1004_1$-$1004_3$.

Figure 11:
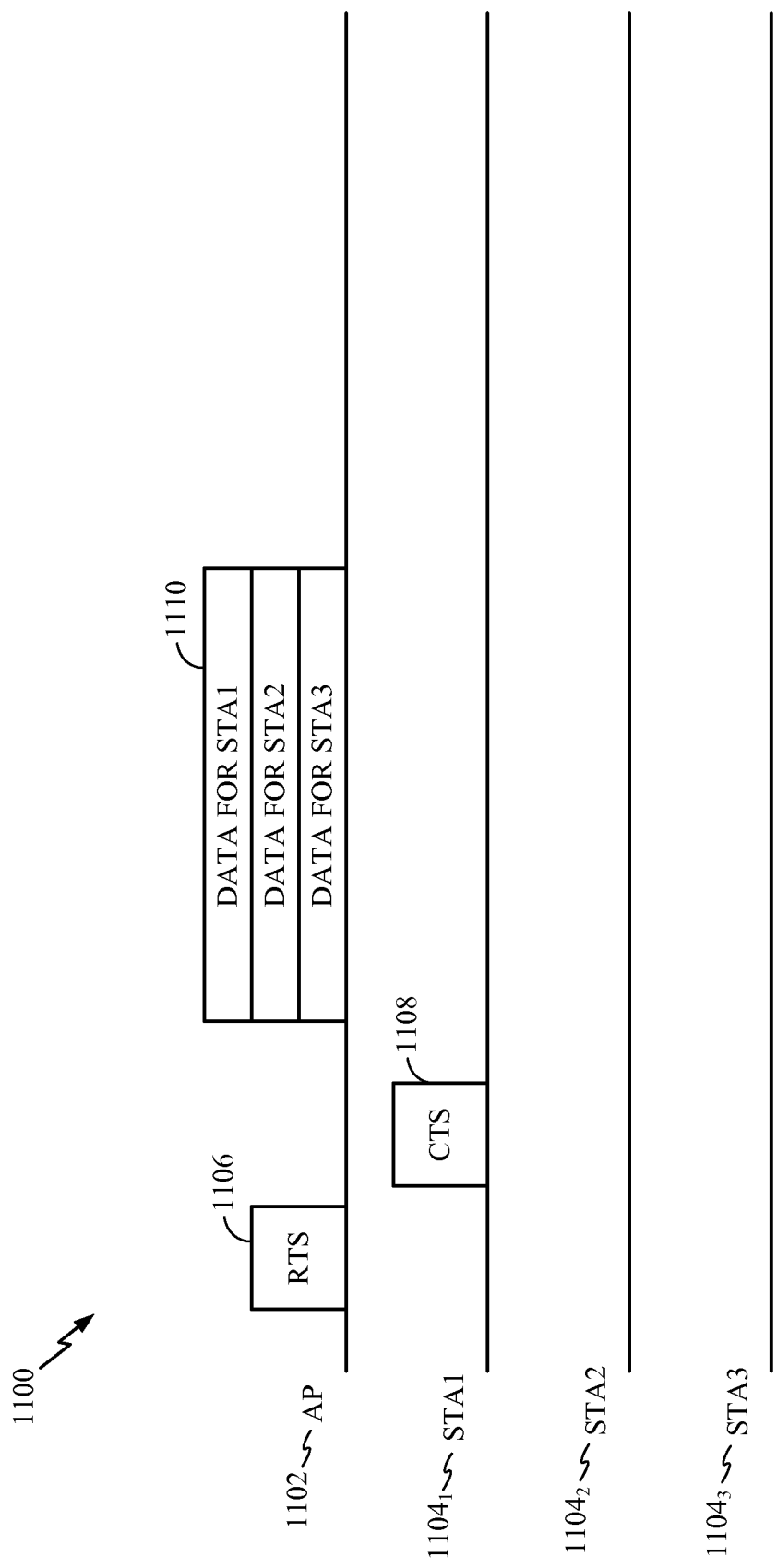
FIG. 11 illustrates a fourth example exchange of control messages preceding MU-MIMO transmission in accordance with certain aspects of the present disclosure.

FIG. 11 illustrates an example RTS/CTS based medium reservation protocol 1100 with a single transmission of RTS and a single transmission of CTS message for MU-MIMO communication in accordance with certain aspects of the present disclosure. As illustrated in FIG. 11, an AP 1102 may transmit an RTS message 1106 to one of STAs $1104_1$, $1104_2$, $1104_3$ (e.g., to the STA $1104_1$) to reserve a medium for data communication. Then, the STA $1104_1$ may respond with a CTS transmission 1108. Once the AP 1102 receives the CTS message 1108, the AP may start downlink MU-MIMO transmissions 1110 to the STAs $1104_1$-$1104_3$.

The STA $1104_1$ may be selected by the AP 1102 as a destination of the RTS message 1106. In one aspect, the STA $1104_1$ may be selected as a destination for a first packet in a queue associated with a traffic belonging to a class of traffics that won contention to access the medium. In another aspect, the STA $1104_1$ may be selected based on a number of collisions during data communication over the medium associated with each of the STAs $1104_1$-$1104_3$. For example, the STA $1104_1$ may be the one that experiences the largest number of collisions among the STAs $1104_1$, $1104_2$, $1104_3$.

Figure 12:
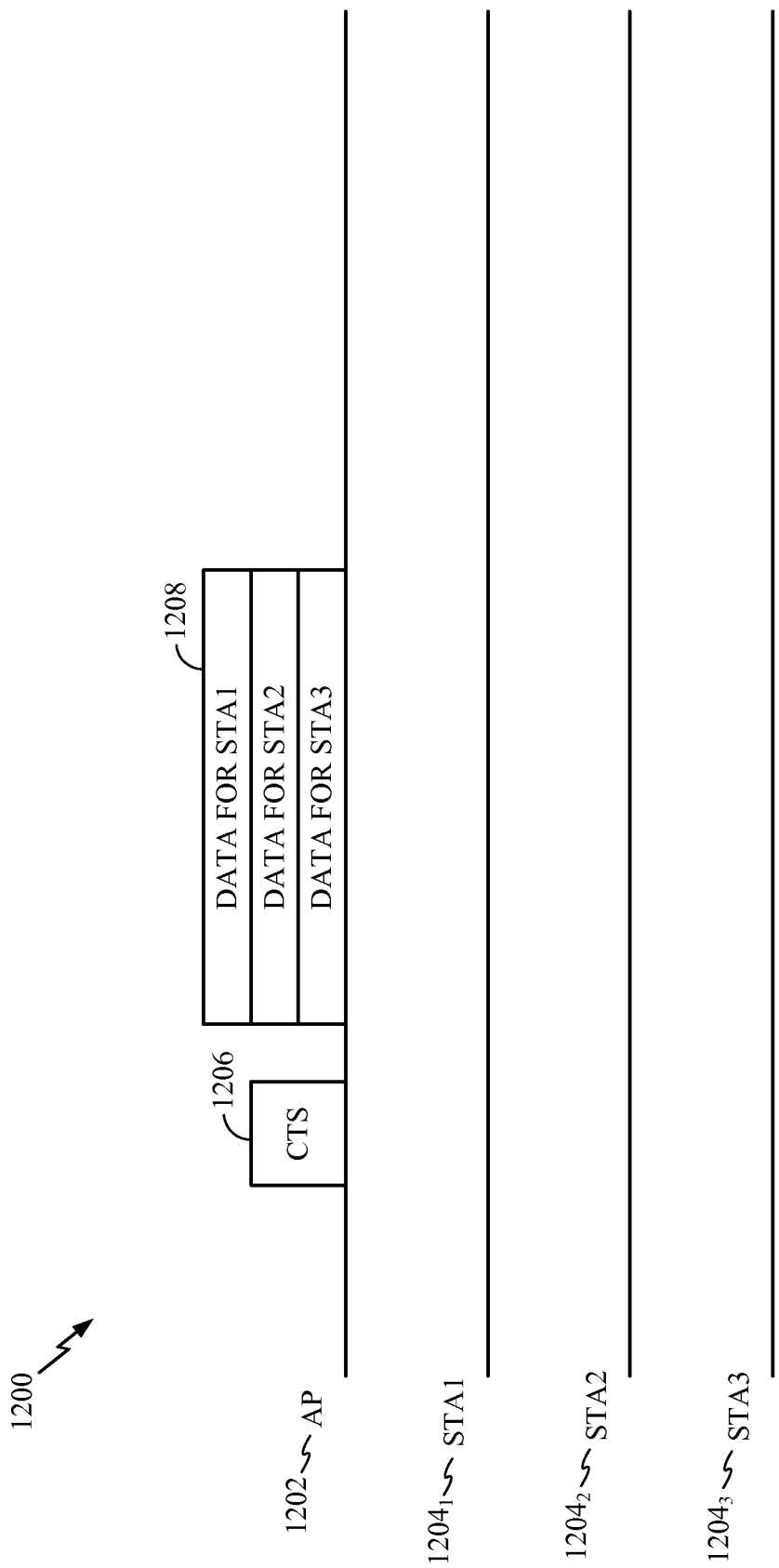
FIG. 12 illustrates a fifth example exchange of control messages preceding MU-MIMO transmission in accordance with certain aspects of the present disclosure.

In yet another aspect of the present disclosure, transmitting one or more RTS messages for reserving a medium for data communication may be avoided, and an overhead of exchanging control messages may be therefore reduced. FIG. 12 illustrates an example CTS based medium reservation protocol 1200 with a single transmission of CTS message for MU-MIMO communication in accordance with certain aspects of the present disclosure.

As illustrated in FIG. 12, an AP 1202 may transmit a confirmation message 1206 announcing reservation of a medium for data communication during a defined time period. The confirmation message 1206 may correspond to a clear-to-send-to-self message, and it may comprise NAV information related to the defined time period. Subsequent to the transmission of confirmation message 1206, data 1208 may be transmitted over the medium to a plurality of STAs (e.g., STAs 1204$_1$, 1204$_2$, 1204$_3$ illustrated in FIG. 12) during the defined time period.

Figure 13:
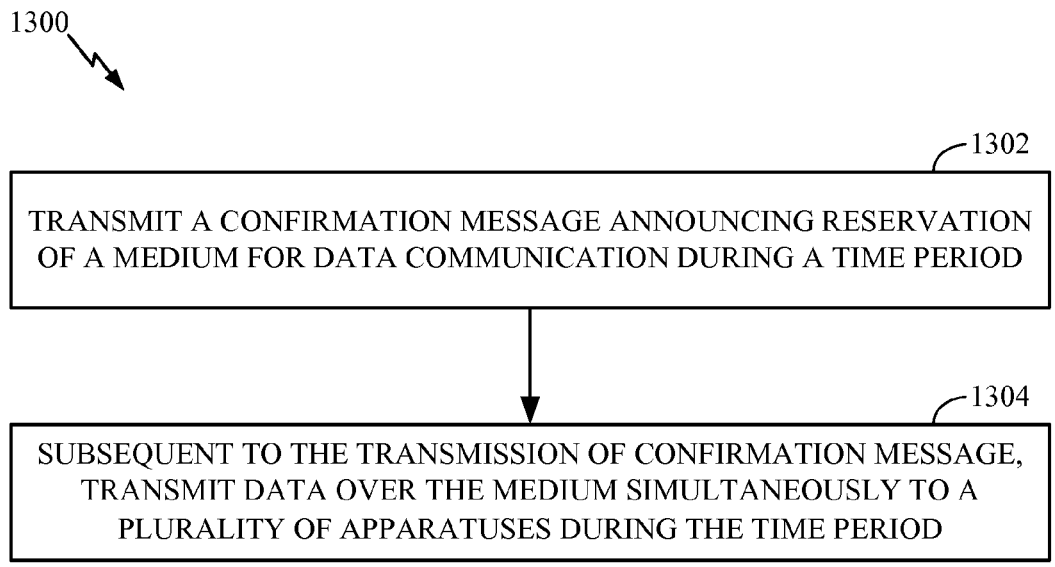
FIG. 13 illustrates third example operations that may be performed at an access point in accordance with certain aspects of the present disclosure.
Figure 13A:
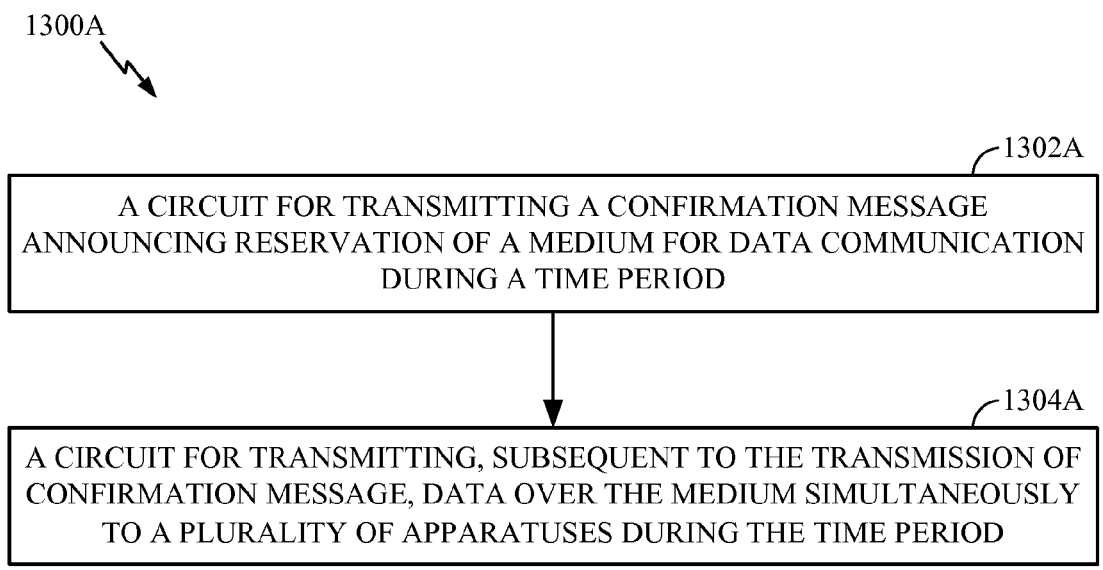
FIG. 13A illustrates example components capable of performing the operations illustrated in FIG. 13.

FIG. 13 illustrates example operations 1300 that may be performed at an AP (e.g., the AP 1202 from FIG. 12) in accordance with certain aspects of the present disclosure. At 1302, the AP may transmit a confirmation message announcing reservation of a medium for data communication during a time period. At 1304, subsequent to the transmission of confirmation message, the AP may transmit data over the medium simultaneously to a plurality of apparatuses during the time period. In an aspect, the data transmitted simultaneously may comprise an MU-MIMO VHT PPDU.

In an aspect, the confirmation message may have a format substantially the same as a clear-to-send-to-self message format. Further, the confirmation message may comprise NAV information related to the time period.

Figure 14:
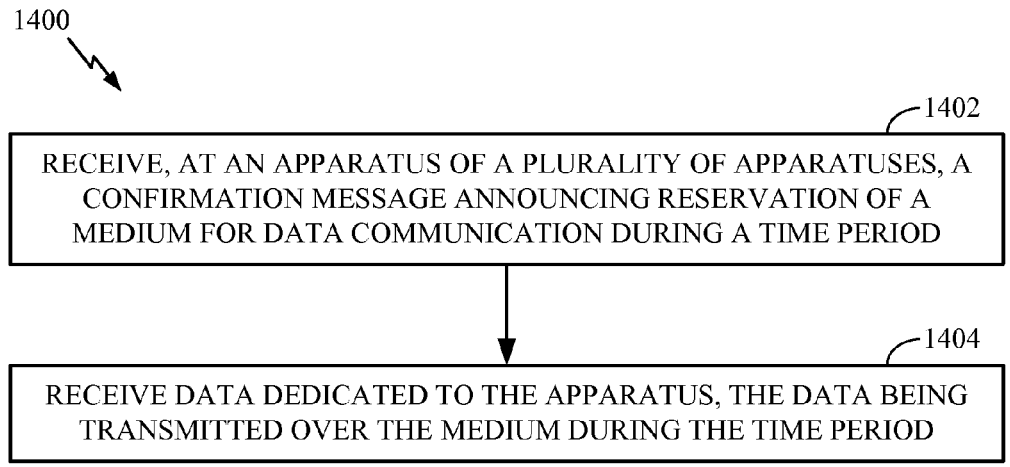
FIG. 14 illustrates third example operations that may be performed at a user station in accordance with certain aspects of the present disclosure.
Figure 14A:
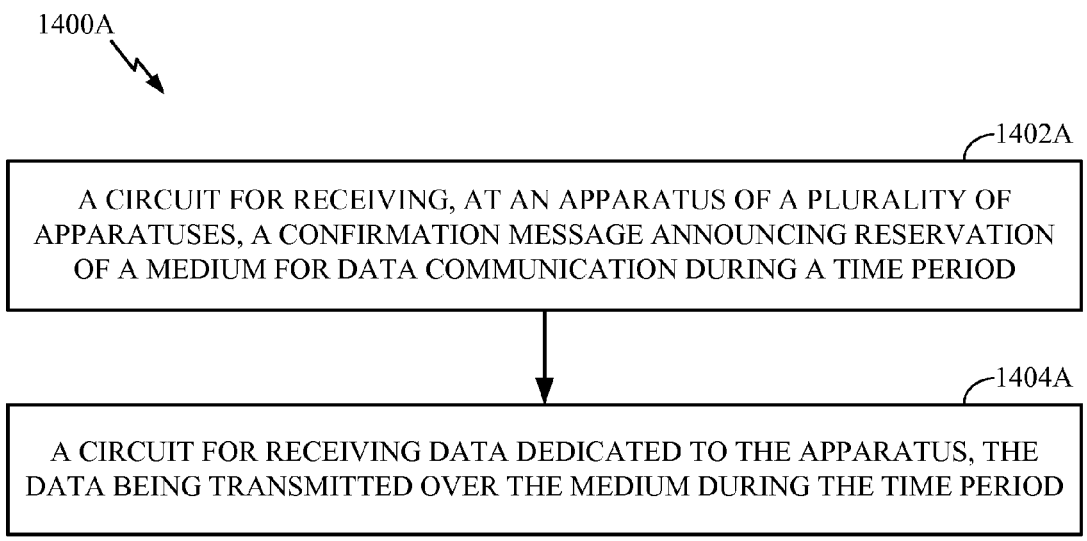
FIG. 14A illustrates example components capable of performing the operations illustrated in FIG. 14.

FIG. 14 illustrates example operations 1400 that may be performed at a STA in accordance with certain aspects of the present disclosure. At 1402, the STA of a plurality of STAs may receive a confirmation message announcing reservation of a medium for data communication during a time period. At 1404, the STA may receive data dedicated to that STA, the data being transmitted over the medium during the time period.

Referring to at least one of the aforementioned example protocols 400, 700, 1000, 1100, 1200, certain aspects of the present disclosure support methods comprising a transmission by an AP to one or more STAs in a set of receiving STAs. The transmission by the AP may comprise an exchange of control messages for medium reservation with at least one STA, and transmitting data from the AP to the one or more STAs in the set of receiving STAs. Further, the AP may receive acknowledgments for the transmitted data from the one or more STAs. The control messages may be exchanged before the data transmission. According to certain aspects, the control messages may comprise at least one of: one or more RTS messages, or one or more CTS messages.

Each of the RTS messages may comprise at least one of NAV information or a sender address. An indication of the NAV may protect at least one of: a following data transmission time, or a following acknowledgment transmission time. Further, each of the RTS messages may comprise a list of addresses of destination STAs, while that RTS message may be compliant with IEEE 802.11 family of wireless communication standards.

Further, in an aspect, each of the RTS messages (e.g., the RTS messages 706, 710 and 714 from FIG. 7) may comprise an indication of order in which the STAs may be required to reply with CTS transmissions. In another aspect, each of the RTS messages may comprise an indication of time at which one or multiple STAs should reply with one or more CTS messages.

In an aspect, each of the RTS messages (e.g., the RTS messages 706, 710 and 714 from FIG. 7) may comprise a unicast message. In another aspect, a single broadcast or multicast RTS message (e.g., the RTS message 406 from FIG. 4) may be transmitted to a plurality of STAs. Further, each of the RTS messages (e.g., the RTS messages 706, 710 and 714 from FIG. 7) may comprise a spatial stream allocation to be used by one or more STAs for the CTS message reply.

In an aspect, each of the RTS messages (e.g., the RTS messages 706, 710 and 714 from FIG. 7) may be transmitted on a primary frequency channel. In another aspect, each of the RTS messages may be transmitted on a primary frequency channel and on one or more secondary channels.

In an aspect, each CTS message may be transmitted on each and only the frequency channels corresponding to channels of the received RTS messages. In another aspect, each CTS message may be transmitted from a STA only if the set of channels where a RTS message is received comprise a primary channel.

In one aspect, data for a STA may not be transmitted if no CTS message is received from that STA on a primary channel. In another aspect, data for a STA may not be transmitted if no CTS message is received from that STA in at least one of the channels where a RTS message was transmitted for that STA. Data for each STA may be transmitted using a plurality of frequency channels. These frequency channels may belong to a subset of frequency channels where a CTS message was received from that STA. Alternatively, the frequency channels utilized for data transmission may belong to a subset of frequency channels where one or more CTS messages were received from that STA and all other STAs in the plurality of STAs.

Each CTS message may comprise an indication of NAV information. In an aspect, the indication of NAV may be the same one as being received within a corresponding RTS message. Further, each CTS message may be compliant with IEEE 802.11 family of wireless communication standards.

In one aspect, an AP may be transmitting a single RTS message (e.g., the RTS message 1106 from FIG. 11) destined to a single STA in the set of receiving STAs by using, for example, the Enhanced Distributed Channel Access (EDCA) protocol for medium access. That single STA may be chosen as a destination for traffic defined as a "primary traffic". The "primary traffic" may comprise a traffic belonging to a class of traffics that won contention to access the medium. In another aspect, an AP may be transmitting a single RTS message (e.g., the RTS message 1006 from FIG. 10) destined to multiple STAs in a set of receiving STAs by utilizing the EDCA medium access protocol.

The AP may transmit multiple RTS messages (e.g., the RTS messages 706, 710 and 714 from FIG. 7) destined to multiple STAs in the set of receiving STAs. In one aspect, the multiple RTS messages may be transmitted sequentially to different STAs in the set of receiving STAs. At least the first RTS message (i.e., the RTS message 706) may be transmitted according to the EDCA medium access protocol. The RTS messages, except the first one, may be transmitted immediately after the reception of a CTS message received as a reply to a previously transmitted RTS message. In another aspect, the multiple RTS messages may be transmitted simultaneously to different STAs in the set of receiving STAs. Further, the simultaneous CTS messages may be transmitted in accordance with MU-MIMO transmission.

Each STA that receives an RTS message may respond with transmitting a CTS message. In one aspect, the CTS message may be transmitted as an immediate reply to the received RTS message. The CTS message in the immediate reply may be transmitted according to a spatial stream allocation specified in the RTS message. Alternatively, the CTS message in the immediate reply may be transmitted using a signal which is substantially the same for all the STAs transmitting simultaneous CTS messages.

In another aspect, the CTS message may be transmitted after a time specified in the received RTS message. In yet another aspect, the CTS message may be transmitted according to a transmission order received in the RTS message. In this case, the STA may count a number of preceding CTS transmissions in order to determine when to transmit its CTS message. The counting may be performed by detecting the previous CTS transmissions. Further, the CTS message may not be transmitted by a STA if a NAV counter was already set for that STA.

It should be noted that an AP may exclude from a subsequent multi user data transmission a STA that did not return a CTS message as a response to an RTS message transmitted from the AP. Further, the AP may include at least one new STA in a set of receiving STAs, if no CTS message is transmitted by one or more of the STAs in the set of receiving STAs for which an RTS message was transmitted. Then, the AP may start exchanging control messages with the at least one new STA.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500, 600, 800, 900, 1300 and 1400 illustrated in FIGS. 5, 6, 8, 9, 13 and 14 correspond to components 500A, 600A, 800A, 900A, 1300A and 1400A illustrated in FIGS. 5A, 6A, 8A, 9A, 13A and 14A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one" of a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 222 from FIG. 2 of the access point 110, the transmitter 254 from FIG. 2 of the user terminal 120, or the transmitter 310 from FIG. 3 of the wireless device 302. The means for receiving may comprise a receiver, e.g., the receiver 222 from FIG. 2 of the access point 110, the receiver 254 from FIG. 2 of the user terminal 120, or the receiver 312 from FIG. 3 of the wireless device 302. The means for specifying may comprise an application specific integrated circuit, e.g., the processor 210 from FIG. 2 of the access point 110, the processor 242 from FIG. 2 of the access point 110, the processor 270 from FIG. 2 of the user terminal 120, the processor 288 from FIG. 2 of the user terminal 120, or the processor 304 from FIG. 3 of the wireless device 302. The means for constructing may comprise an application specific integrated circuit, e.g., the processor 210, the processor 288, or the processor 304. The means for mapping may comprise a mapper, e.g., the processor 210, the processor 288, or the processor 304. The means for applying may comprise an application specific integrated circuit, e.g., the processor 210, the processor 288, or the processor 304. The means for scrambling may comprise a scrambler, e.g., the processor 210, the processor 288, or the processor 304. The means for identifying may comprise an application specific integrated circuit, e.g., the processor 210, the processor 242, the processor 270, the processor 288, or the processor 304. The means for de-mapping may comprise a de-mapper, e.g., the processor 242, the processor 270, or the processor 304. The means for counting may comprise an application specific integrated circuit, e.g., the processor 210, the processor 242, the processor 270, the processor 288, or the processor 304. The means for detecting may comprise an application specific integrated circuit, e.g., the processor 242, the processor 270, or the processor 304. The means for selecting may comprise an application specific integrated circuit, e.g., the processor 210, the processor 288, or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
a circuit configured to:
specify one or more parameters in a management message to ensure that a plurality of confirmation messages transmitted simultaneously on a channel from two or more apparatuses of a plurality of apparatuses in response to a reservation message comprise a same waveform;
a transmitter configured to:
transmit the management message, to the plurality of apparatuses, prior to transmitting the reservation message, and
transmit the reservation message to the plurality of apparatus to reserve a medium for data communication; and
a receiver configured to:
receive, on the channel, the plurality of confirmation messages, wherein the confirmation messages are of the same waveform, wherein
the transmitter is also configured to transmit data over the medium to the two or more apparatuses in response to the confirmation messages.

2. The apparatus of claim 1, wherein:
the reservation message has a format of a request-to-send (RTS) message, and
each of the confirmation messages has a format of a clear-to-send (CTS) message.

3. The apparatus of claim 1, wherein the reservation message comprises Network Allocation Vector (NAV) information.

4. The apparatus of claim 1, wherein one of the parameters indicates a scrambling sequence to be applied at the two or more apparatuses for transmitting the confirmation messages.

5. The apparatus of claim 1, wherein:
the reservation message comprises a request-to-send (RTS) message including a multicast group address of the apparatuses.

6. The apparatus of claim 1, further comprising:
a circuit configured to construct a unique group address for the plurality of apparatuses, wherein
the management message further specifies the unique group address.

7. The apparatus of claim 1, further comprising:
a mapper configured to map identifications of the plurality of apparatuses to a group Media Access Control (MAC) address based on a function, wherein
the management message further specifies the group MAC address.

8. The apparatus of claim 1, wherein the reservation message comprises a broadcast message transmitted to the apparatuses.

9. The apparatus of claim 1, wherein the reservation message comprises a message transmitted to the apparatuses according to the Enhanced Distributed Channel Access (EDCA) protocol.

10. The apparatus of claim 1, wherein the data transmitted to the two or more apparatuses comprise a Multi User Multiple Input Multiple Output Very High Throughput Physical layer convergence procedure Protocol Data Unit (MU-MIMO VHT PPDU).

11. A method for wireless communications, comprising:
specifying one or more parameters in a management message to ensure that a plurality of confirmation messages transmitted simultaneously on a channel from two or more apparatuses of a plurality of apparatuses in response to a reservation message comprise a same waveform;
transmitting the management message, to the plurality of apparatuses, prior to transmitting the reservation message;
transmitting the reservation message to the plurality of apparatuses to reserve a medium for data communication;
receiving, on the channel, the plurality of confirmation messages, wherein the confirmation messages are of the same waveform; and
transmitting data over the medium to the two or more apparatuses in response to the confirmation messages.

12. The method of claim 11, wherein:
the reservation message has a format of a request-to-send (RTS) message, and
each of the confirmation messages has a format of a clear-to-send (CTS) message.

13. The method of claim 11, wherein the reservation message comprises Network Allocation Vector (NAV) information.

14. The method of claim 11, wherein one of the parameters indicates a scrambling sequence to be applied at the two or more apparatuses for transmitting the confirmation messages.

15. The method of claim 11, wherein:
the reservation message comprises a request-to-send (RTS) message including a multicast group address of the apparatuses.

16. The method of claim 11, further comprising:
constructing a unique group address for the plurality of apparatuses, wherein
the management message further specifies the unique group address.

17. The method of claim 11, further comprising:
mapping identifications of the plurality of apparatuses to a group Media Access Control (MAC) address based on a function, wherein
the management message further specifies the group MAC address.

18. The method of claim 11, wherein the reservation message comprises a broadcast message transmitted to the apparatuses.

19. The method of claim 11, wherein the reservation message comprises a message transmitted to the apparatuses according to the Enhanced Distributed Channel Access (EDCA) protocol.

20. The method of claim 11, wherein the data transmitted to the two or more apparatuses comprise a Multi User Multiple Input Multiple Output Very High Throughput Physical layer convergence procedure Protocol Data Unit (MU-MIMO VHT PPDU).

21. An apparatus for wireless communications, comprising:
means for specifying one or more parameters in a management message to ensure that a plurality of confirmation messages transmitted simultaneously on a channel from two or more apparatuses of a plurality of apparatuses in response to a reservation message comprise a same waveform;
means for transmitting the management message, to the plurality of apparatuses, prior to transmitting the reservation message;
means for transmitting the reservation message to the plurality of apparatuses to reserve a medium for data communication;
means for receiving, on the channel, the plurality of confirmation messages, wherein the confirmation messages are of the same waveform; and
means for transmitting data over the medium to the two or more apparatuses in response to the confirmation messages.

22. The apparatus of claim 21, wherein:
the reservation message has a format of a request-to-send (RTS) message, and
each of the confirmation messages has a format of a clear-to-send (CTS) message.

23. The apparatus of claim 21, wherein the reservation message comprises Network Allocation Vector (NAV) information.

24. The apparatus of claim 21, wherein one of the parameters indicates a scrambling sequence to be applied at the two or more apparatuses for transmitting the confirmation messages.

25. The apparatus of claim 21, wherein:
the reservation message comprises a request-to-send (RTS) message including a multicast group address of the apparatuses.

26. The apparatus of claim 21, further comprising:
means for constructing a unique group address for the plurality of apparatuses, wherein
the management message further specifies the unique group address.

27. The apparatus of claim 21, further comprising:
means for mapping identifications of the plurality of apparatuses to a group Media Access Control (MAC) address based on a function, wherein
the management message further specifies the group MAC address.

28. The apparatus of claim 21, wherein the reservation message comprises a broadcast message transmitted to the apparatuses.

29. The apparatus of claim 21, wherein the reservation message comprises a message transmitted to the apparatuses according to the Enhanced Distributed Channel Access (EDCA) protocol.

30. The apparatus of claim 21, wherein the data transmitted to the two or more apparatuses comprise a Multi User Multiple Input Multiple Output Very High Throughput Physical layer convergence procedure Protocol Data Unit (MU-MIMO VHT PPDU).

31. A computer-program product for wireless communications, comprising a computer-readable device encoded with instructions executable to:
specify one or more parameters in a management message to ensure that a plurality of confirmation messages transmitted simultaneously on a channel from two or more apparatuses of a plurality of apparatuses in response to a reservation message comprise a same waveform;
transmit the management message, to the plurality of apparatuses, prior to transmitting the reservation message;
transmit the reservation message to the plurality of apparatuses to reserve a medium for data communication;
receive, on the channel, the plurality of confirmation messages, wherein the confirmation messages are of the same waveform; and
transmit data over the medium to the two or more apparatuses in response to the confirmation messages.

32. An access point, comprising:
at least one antenna;
a circuit configured to:
specify one or more parameters in a management message to ensure that a plurality of confirmation messages transmitted simultaneously on a channel from two or more apparatuses of a plurality of apparatuses in response to a reservation message comprise a same waveform;
a transmitter configured to:
transmit the management message, to the plurality of apparatuses, prior to transmitting the reservation message, and
transmit the reservation message to the plurality of apparatuses to reserve a medium for data communication; and
a receiver configured to:
receive, on the channel, the plurality of confirmation messages, wherein the confirmation messages are of the same waveform, wherein
the transmitter is also configured to transmit data over the medium to the two or more apparatuses in response to the confirmation messages.

33. An apparatus for wireless communications, comprising:
a receiver configured to:
receive, at the apparatus of a plurality of apparatuses, a management message prior to receiving a reservation message, wherein the management message comprises one or more parameters to ensure that all confirmation messages, transmitted in response to the reservation message, comprise a same waveform, and
receive, at the apparatus of the plurality of apparatuses, the reservation message transmitted to the plurality of apparatuses for reserving a medium for communicating data; and
a transmitter configured to:
transmit, in response to the reservation message, a confirmation message simultaneously with one or more other confirmation messages transmitted from one or more of the plurality of apparatuses, wherein all the transmitted confirmation messages are of the same waveform, wherein
the receiver is also configured to receive data dedicated to the apparatus.

34. The apparatus of claim 33, wherein:
the reservation message has a format of a request-to-send (RTS) message, and the confirmation message has a format of a clear-to-send (CTS) message.

35. The apparatus of claim 33, wherein one of the parameters indicates a scrambling sequence, and the apparatus further comprising:
a scrambler configured to apply the indicated scrambling sequence for transmitting the confirmation message, the same scrambling sequence is applied at the one or more apparatuses for transmitting the other confirmation messages.

36. The apparatus of claim 33, wherein the reservation message comprises a request-to-send (RTS) message including a multicast group address of the apparatuses, and the apparatus further comprising:
a circuit configured to identify, based on the multicast group address, that the data are addressed to the apparatus.

37. The apparatus of claim 33, wherein:
the management message further comprises a unique group address of the plurality of apparatuses, and the apparatus further comprising
a circuit configured to identify, based on the unique group address, that the data are addressed to the apparatus.

38. The apparatus of claim 33, wherein: the management message further comprises a group Media Access Control (MAC) address associated with the plurality of apparatuses, and the apparatus further comprising:
a de-mapper configured to de-map the group MAC address based on a function to obtain an identification of the apparatus; and
a circuit configured to identify, based on the obtained identification, that the data are addressed to the apparatus.

39. The apparatus of claim 33, wherein the confirmation message comprises Network Allocation Vector (NAV) information from the received reservation message.

40. The apparatus of claim 33, wherein each of the confirmation messages is transmitted according to a spatial stream allocation specified in the reservation message.

41. A method for wireless communications, comprising:
receiving, at an apparatus of a plurality of apparatuses, a management message prior to receiving a reservation message, wherein the management message comprises one or more parameters to ensure that all confirmation messages, transmitted in response to the reservation message, comprise a same waveform;
receiving, at the apparatus of the plurality of apparatuses, the reservation message transmitted to the plurality of apparatuses for reserving a medium for communicating data;
transmitting, in response to the reservation message, a confirmation message simultaneously with one or more other confirmation messages transmitted from one or more of the plurality of apparatuses, wherein all the transmitted confirmation messages are of the same waveform; and
receiving data dedicated to the apparatus.

42. The method of claim 41, wherein:
the reservation message has a format of a request-to-send (RTS) message, and the confirmation message has a format of a clear-to-send (CTS) message.

43. The method of claim 41, wherein one of the parameters indicates a scrambling sequence, and the method further comprising:
applying the indicated scrambling sequence for transmitting the confirmation message, the same scrambling sequence is applied at the one or more apparatuses for transmitting the other confirmation messages.

44. The method of claim 41, wherein the reservation message comprises a request-to-send (RTS) message including a multicast group address of the apparatuses, and the method further comprising:
identifying, based on the multicast group address, that the data are addressed to the apparatus.

45. The method of claim 41, wherein: the management message further comprises a unique group address of the plurality of apparatuses, the method further comprising:
identifying, based on the unique group address, that the data are addressed to the apparatus.

46. The method of claim 41, wherein:
the management message further comprises a group Media Access Control (MAC) address associated with the plurality of apparatuses; the method further comprising:
de-mapping the group MAC address based on a function to obtain an identification of the apparatus; and identifying, based on the obtained identification, that the data are addressed to the apparatus.

47. The method of claim 41, wherein the confirmation message comprises Network Allocation Vector (NAV) information from the received reservation message.

48. The method of claim 41, wherein each of the confirmation messages is transmitted according to a spatial stream allocation specified in the reservation message.

49. An apparatus for wireless communications, comprising:
    means for receiving, at the apparatus of a plurality of apparatuses, a management message prior to receiving a reservation message, wherein the management message comprises one or more parameters to ensure that all confirmation messages, transmitted in response to the reservation message, comprise a same waveform;
    means for receiving, at the apparatus of the plurality of apparatuses, the reservation message transmitted to the plurality of apparatuses for reserving a medium for communicating data;
    means for transmitting, in response to the reservation message, a confirmation message simultaneously with one or more other confirmation messages transmitted from one or more of the plurality of apparatuses, wherein all the transmitted confirmation messages are of the same waveform; and
    means for receiving data dedicated to the apparatus.

50. The apparatus of claim 49, wherein:
    the reservation message has a format of a request-to-send (RTS) message, and the confirmation message has a format of a clear-to-send (CTS) message.

51. The apparatus of claim 49, wherein one of the parameters indicates a scrambling sequence, and the apparatus further comprising:
    means for applying the indicated scrambling sequence for transmitting the confirmation message, the same scrambling sequence is applied at the one or more apparatuses for transmitting the other confirmation messages.

52. The apparatus of claim 49, wherein the reservation message comprises a request-to-send (RTS) message including a multicast group address of the apparatuses, and the apparatus further comprising:
    means for identifying, based on the multicast group address, that the data are addressed to the apparatus.

53. The apparatus of claim 49, wherein:
    the management frame further comprises a unique group address of the plurality of apparatuses, and the apparatus further comprising
    means for identifying, based on the unique group address, that the data are addressed to the apparatus.

54. The apparatus of claim 49, wherein: the a management message further comprises a group Media Access Control (MAC) address associated with the plurality of apparatuses, and the apparatus further comprising:
    means for de-mapping the group MAC address based on a function to obtain an identification of the apparatus; and
    means for identifying, based on the obtained identification, that the data are addressed to the apparatus.

55. The apparatus of claim 49, wherein the confirmation message comprises Network Allocation Vector (NAV) information from the received reservation message.

56. The apparatus of claim 49, wherein each of the confirmation messages is transmitted according to a spatial stream allocation specified in the reservation message.

57. A computer-program product for wireless communications, comprising a computer-readable device encoded with instructions executable to:
    receive, at an apparatus of a plurality of apparatuses, a management message prior to receiving a reservation message, wherein the management message comprises one or more parameters to ensure that all confirmation messages, transmitted in response to the reservation message, comprise a same waveform;
    receive, at the apparatus of the plurality of apparatuses, the reservation message transmitted to the plurality of apparatuses for reserving a medium for communicating data;
    transmit, in response to the reservation message, a confirmation message simultaneously with one or more other confirmation messages transmitted from one or more of the plurality of apparatuses, wherein all the transmitted confirmation messages are of the same waveform; and
    receive data dedicated to the apparatus.

58. An access terminal, comprising:
    at least one antenna;
    a receiver configured to:
        receive, at an apparatus of a plurality of apparatuses, a management message prior to receiving a reservation message, wherein the management message comprises one or more parameters to ensure that all confirmation messages, transmitted in response to the reservation message, comprise a same waveform, and
        receive, at the apparatus of the plurality of apparatuses, the reservation message transmitted to the plurality of apparatuses for reserving a medium for communicating data; and
    a transmitter configured to:
        transmit, in response to the reservation message, a confirmation message simultaneously with one or more other confirmation messages transmitted from one or more of the plurality of apparatuses, wherein all the transmitted confirmation messages are of the same waveform, wherein
        the receiver is also configured to receive data dedicated to the apparatus.

* * * * *